(12) United States Patent
Okello

(10) Patent No.: US 8,411,779 B2
(45) Date of Patent: Apr. 2, 2013

(54) COMMUNICATION SYSTEM, TRANSMITTER, RECEIVER AND MULTIPLE ACCESS METHOD

(75) Inventor: James Awuor Okello, Tokyo (JP)

(73) Assignee: NEC Corporation, Tokyo (JP)

(*) Notice: Subject to any disclaimer, the term of this patent is extended or adjusted under 35 U.S.C. 154(b) by 1133 days.

(21) Appl. No.: 12/308,849

(22) PCT Filed: Jun. 15, 2007

(86) PCT No.: PCT/JP2007/062111
§ 371 (c)(1),
(2), (4) Date: Dec. 24, 2008

(87) PCT Pub. No.: WO2008/001627
PCT Pub. Date: Jan. 3, 2008

(65) Prior Publication Data
US 2009/0185635 A1    Jul. 23, 2009

(30) Foreign Application Priority Data
Jun. 27, 2006 (JP) .................................. 2006-176529

(51) Int. Cl.
*H04B 7/02* (2006.01)
*H04L 25/49* (2006.01)
(52) U.S. Cl. ....................................... 375/267; 375/285
(58) Field of Classification Search .................. 375/259, 375/260, 267, 295, 296, 316, 322, 324, 340, 375/346, 347, 343; 714/699, 746, 752, 755, 714/756, 787; 370/203, 210, 208; 708/100, 708/200, 300, 304
See application file for complete search history.

(56) References Cited

U.S. PATENT DOCUMENTS
6,963,619 B1 * 11/2005 Gesbert et al. ................ 375/267
7,230,995 B2    6/2007 Wengerter
7,315,566 B2    1/2008 Tanno et al.
7,760,758 B2    7/2010 Okello
(Continued)

FOREIGN PATENT DOCUMENTS
CN    2428919 Y    5/2001
CN    1411195 A    4/2003
(Continued)

OTHER PUBLICATIONS
G. J. Foschini and M. J. Gans, "On limits of wireless communications in a fading environment when using multiple antennas," Wireless Personal Communications, vol. 6, pp. 311-335, 1998.
(Continued)

*Primary Examiner* — David C. Payne
*Assistant Examiner* — Vineeta Panwalkar
(74) *Attorney, Agent, or Firm* — McGinn IP Law Group, PLLC

(57) ABSTRACT

In a communications system including a transmitter for transmitting signals over a transmission channel and a receiver for receiving the signals, the transmitter includes: a filter for filtering a modulated signal to modify amplitude and phase characteristics of the modulated signal; and a first processor for performing interleaving process and/or scrambling process for the filtered signal. On the other hand, the receiver includes: a second processor for performing deinterleaving process and/or descrambling process for a received signal; and an inverse filter for filtering a signal supplied from the second processor.

18 Claims, 17 Drawing Sheets

U.S. PATENT DOCUMENTS

| | | | |
|---|---|---|---|
| 2005/0122896 A1* | 6/2005 | Song et al. | 370/210 |
| 2006/0018247 A1 | 1/2006 | Driesen et al. | |
| 2006/0198454 A1* | 9/2006 | Chung et al. | 375/260 |

FOREIGN PATENT DOCUMENTS

| | | |
|---|---|---|
| JP | 5-219488 A | 8/1993 |
| JP | 11-215091 A | 8/1999 |
| JP | 2000-286821 A | 10/2000 |
| JP | 2002-111756 A | 4/2002 |
| JP | 2003-179528 A | 6/2003 |
| JP | 2003-244763 A | 8/2003 |
| JP | 2005-318117 A | 11/2005 |
| JP | 2006-42342 A | 2/2006 |
| WO | WO 2004/038987 A2 | 5/2004 |
| WO | WO 2005/057810 A1 | 6/2005 |
| WO | WO 2006/059767 A1 | 6/2006 |

OTHER PUBLICATIONS

A. Goldsmith, S. A. Jafar, N. Jindal and S. Vishwanath, "Capacity limits of MIMO channels," IEEE Journal on Selected Areas in Communications, vol. 21, No. 5, pp. 684-702, Jun. 2003.

Y. Ogawa, K. Nishio, T. Nishimura and T. Ohgane, "A MIMO-OFDM system for high-speed transmission, " 2003 IEEE 58th Vehicular Technology Conference, vol. 1, pp. 53-60, Jan. 2005.

H. Yang, "A road to future broadband wireless access: MIMO-OFDM-based air interface," IEEE Communications Magazine, vol. 43, No. 1, pp. 53-60, Jan. 2005.

A. Belouchrani and M. G. Amin, "Blind source separation based on time-frequency signal representations," IEEE Transactions on Signal Processing, vol. 46 , No. 11, pp. 2888-2897, Nov. 1998.

T. L. Marzetta, "Blast training: Estimating channel characteristics for high capacity space-time wireless," Proceedings of 37th Annual Allerton Conference on Communication, Control, and Computing, pp. 958-966, Sep. 22-24, 1999.

Y. Li and L. Yang, "Semi-blind MIMO channel identification based on error adjustment," Proceedings of IEEE International Conference on Neural Networks and Signal Processing, vol. 2 , pp. 1429-1432, Dec. 14-17, 2003.

Y. Li and K. J. R. Liu, "Adaptive blind source separation and equalization for Multiple-Input/Multiple-Output systems," IEEE Transactions on Information Theory, vol. 44, No. 7, pp. 2864-2876, Nov. 1998.

J. Okello and M. Ikekawa, "Tagging-filter based blind MIMO equalization without signal permutation," IEEE Globecom 2005, vol. 4, pp. 2145-2149, Nov.-Dec. 2005.

W. Zhuang and V. Huang, "Channel precoding using phase distortion for slowly fading channels," Proceedings of Canadian Conference on Electrical and Computer Engineering, pp. 234-237, Sep. 1994.

N. Maeda, Y. Kishiyama, H. Atarashi and M. Sawahashi, "Variable spreading factor-OFCDM with two dimensional spreading that prioritizes time domain spreading for forward link broadband wireless access," IEICE Trans. Commun., vol. E88-B, No. 2, pp. 487-498, Feb. 2005.

D. N. Godard, "Self-recovering equalization and carrier tracking in two-dimensional data communication systems," IEEE Transactions on Communications, vol. 28, No. 11, pp. 1867-1875, Nov. 1980.

N. Oh and Y. O. Chin, "Modified constant modulus algorithm: Blind equalization and carrier phase recovery algorithm," Proc. IEEE ICC, vol. 1, pp. 498-502, Jun. 1995.

A. van der Veen, "Statistical performance analysis of the algebraic constant modulus algorithm," IEEE Transactions on Signal Processing, vol. 50, No. 12, pp. 3083-3097, Dec. 2002.

P. A. Regalia, "A finite-interval constant modulus algorithm," Acoustics, Speech, and Signal Processing, 2002. Proceedings. (ICASSP '02). IEEE International Conference on, vol. 3 , pp. III-2285-III-2288, May 13-17, 2002.

J. G. Proakis, Digital Communications, McGraw Hill, 4th Edition, pp. 840-852.

James Awuor Okello, et al., "MIMObLIND Equalization Based on Independent Space Constraint", Jan. 8, 2004, In: IEICE Technical Report vol. 103, No. 549, pp. 121-126, SAT2003-166, RCS2003-264, DSP2004-169.

Chinese Office Action dated Mar. 31, 2012, with English translation.

* cited by examiner

Two sources
(RELATED ART)

Eight sources
(RELATED ART)

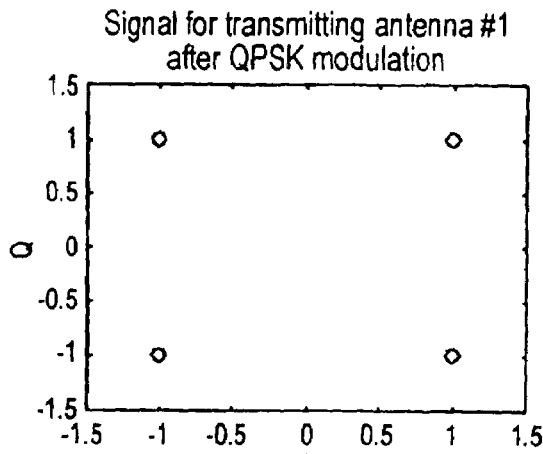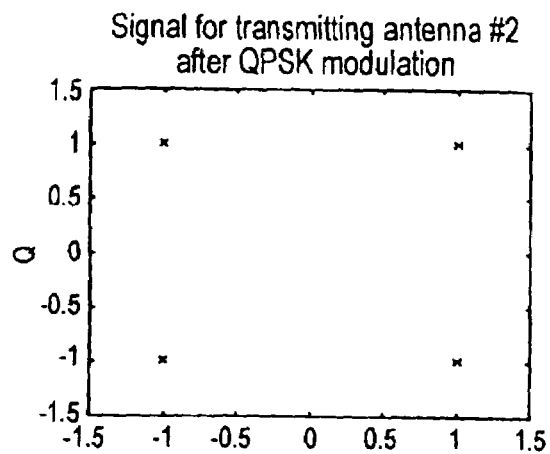
FIG. 10A          FIG. 10B
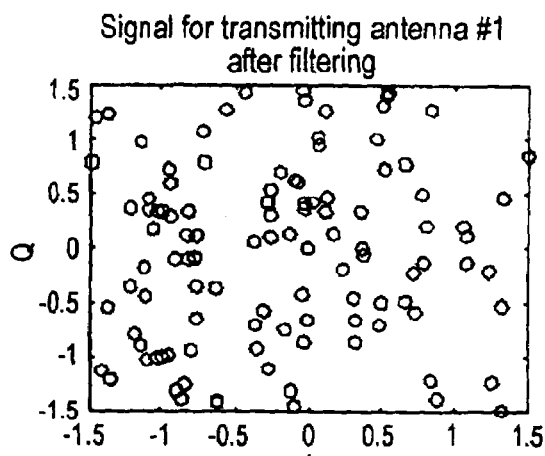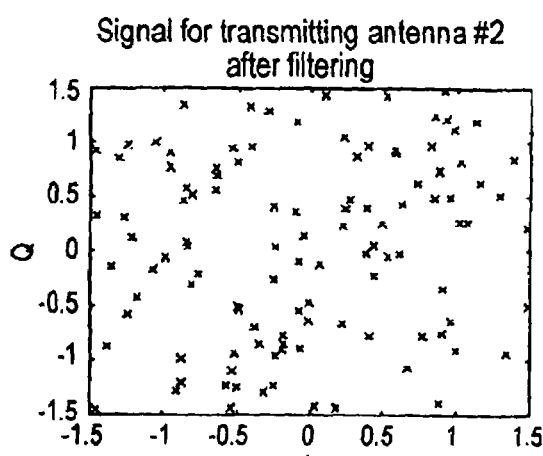
FIG. 11A          FIG. 11B
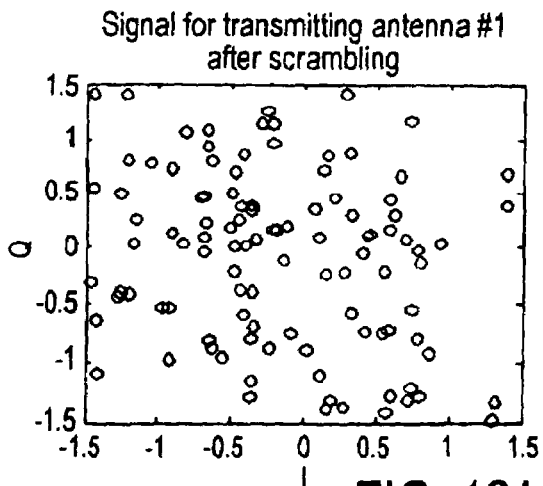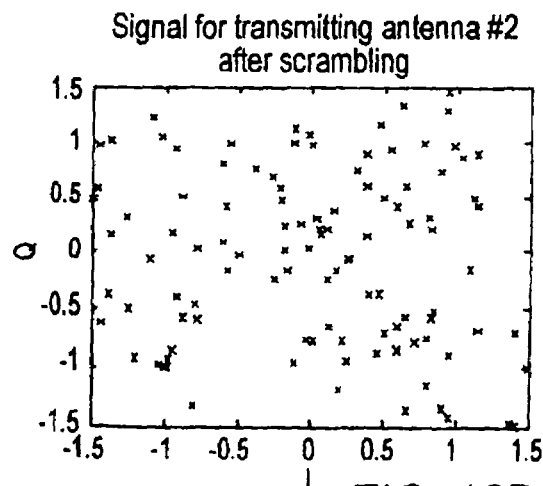
FIG. 12A          FIG. 12B

COMMUNICATION SYSTEM, TRANSMITTER, RECEIVER AND MULTIPLE ACCESS METHOD

TECHNICAL FIELD

This application is base upon and claims the benefit of priority from Japanese Patent Application No. 2006-176529, filed on Jun. 27, 2006, the disclosure of which is incorporated herein its entirety by reference.

The present invention relates to a system with a multiple input and multiple output (MIMO) channel, a transmitter and a receiver used in such a system, and a multiple access method in such a system.

BACKGROUND ARTS

Systems with multiple transmitting antennas and multiple receiving antennas (MIMO: Multiple Input Multiple Output) for transmitting multiple pieces of data between different points have been known [B1]. Since the channel capacity of the MIMO system increases linearly with the number of transmitting antennas thereof [B2], such systems have drawn quite a lot of attention. In order to achieve the highest throughput, each transmitting antenna transmits an independent stream of data that has been generated by serial-to-parallel conversion of the data that is to be transmitted.

In practice, two modes of implementation of such systems are available. Of these modes, a system according the first mode transmits the signal after modulating the signal using OFDM (orthogonal frequency division multiplexing) technique [B3], ([B4]. A system according to the second mode transmits the signal without any OFDM being done [B5]. In a channel, the signals from different transmitting antennas are mixed up in space, while, at the receiver, signal processing technique for multiple receiving antennas is used to separate the signals. These two system of modes simultaneously transmitting multiple signals can be represented using mathematical models shown in Eq.(1) and Eq.(2), respectively.

For an OFDM-MIMO system, a received signal on each of the frequency bins can be expressed as:

$$u_k = Hx_k + n_k \in C^{M \times 1} \quad (1),$$

where $$H = \begin{bmatrix} h_{11} & h_{12} & \dots & h_{1N} \\ h_{21} & h_{22} & \dots & h_{2N} \\ \vdots & \vdots & \ddots & \vdots \\ h_{M1} & h_{M2} & \dots & h_{MN} \end{bmatrix}.$$

The OFDM-MIMO system is a system which uses no convolution operation.

On the other hand, for a non-OFDM system with a channel that is frequency selective [B5], the received signal can be expressed as $$u_{No} = H_{No} * x_k + n_k \in C^{M \times 1} \quad (2),$$

where the superscript of "*" indicates convolution operation, and $$H_{No} = \begin{bmatrix} \sum_k \delta(k) h_{11}(k) & \sum_k \delta(k) h_{12}(k) & \dots & \sum_k \delta(k) h_{1N}(k) \\ \sum_k \delta(k) h_{21}(k) & \sum_k \delta(k) h_{22}(k) & \dots & \sum_k \delta(k) h_{2N}(k) \\ \vdots & \vdots & \ddots & \vdots \\ \sum_k \delta(k) h_{M1}(k) & \sum_k \delta(k) h_{M2}(k) & \dots & \sum_k \delta(k) h_{MN}(k) \end{bmatrix}. \quad (3)$$

Equations (2) and (3) implies that a number of filters must be used for estimating an inverse transfer characteristic of a MIMO channel. In order to obtain the transmitted signal $x_k$ from the received signal $u_{No}$, it is necessary to use $H_{No}$ at the receiver as described above. Such a kind of operation is computationally expensive in comparison to the signal separation in the OFDM-MIMO system. In a non-OFDM system, the receiver has to estimate inverse filters to estimate the inverse characteristic of the channel and this causes increasing in the complexity of the receiver. However, in the OFDM-MIMO system, there is no convolution operation and it is not necessary to estimate the inverse filters.

In the related art, channel state information or inverse channel must be estimated before signals are separated. Such estimation is achieved by sending a training signal, which is used at the receiver to estimate the channel. However, it is necessary to pay an expense of a reduced throughput due to the transmission of the training signal. An alternative approach is a complete blind identification of MIMO CSI (Channel State information) or ICSI (Inverse Channel State information) [B1], [B2], [B6]-[B8]. With this, however, there would be the possibility of separated sources producing permutation of the originally transmitted signals, that is, permutation of the order [B8]. Such permutation would have to be removed by using a maximum likelihood detector (MLD), which considers all possible column-direction combinations and selects the combination with minimum error.

As a solution to the problem of occurrence of permutation in the blindly-separated sources, a tagging scheme based on assigning unique filter to each transmitter was proposed [B9]. The unique filter is a filter having different characteristics for each transmitter. With this technique, each constant modulus source signal is filtered by a unique filter before transmission. At the receiver, an inverse filter is used to convert the non-constant modulus signal back to a constant modulus signal. However, since each source has a unique filter, only the source of interest will be retrieved, and, as a result, the separated signals will be free of source permutations.

However, in such a tagging scheme, the resulting signal may experience a phase rotation as in any other blind algorithm for a single input single output (SISO) system. A solution to this problem is the differential QPSK mode of modulation [B10]. It is also possible to use a channel decoder, which is simpler in configuration since it only involves dealing with a single source. Now, since each transmitting antenna is assigned a unique filter, the length of these filters must also be increased when the number of transmitting antennas increases so as to maintain the uniqueness of the filters. Such an increase in the filter length will increase the computational complexity of the receiver [B9]. When an all-pass is used, the latency of the system will also increase.

FIG. 1 shows a baseband model of an OFDM-MIMO system based on the tagging filters. For explanations purpose, a constant modulus signal is assumed. This system includes, on the transmission side, a plurality of unique filters 101 and antennas 102 provided for respective unique filters. Here, N (N≧2) pieces of unique filters 101 are provided. The signals from transmitting antennas 102 reach the reception side having M pieces of receiving antennas 103. At the reception side, further arranged are filters 104 having inverse characteristics of respective filters 101 on the transmission side, and signal processors 105 provided for respective filters 104. Signal processors 105 perform blind MIMO signal processing. On the reception side, a signal subjected to blind signal separation is outputted from each signal processor 105.

On the transmission side, after carrying out serial-to-parallel conversion for the data to be transmitted, each element of the parallel data is filtered with unique filter 101 that has an impulse response $f_{Tx}^{(l)}(n)$. Here, "(l)" in the superscript corresponds to the index of the buffered input $x_l(k)$, where, l=1, . . . , N.

The baseband signal which is transmitted using the l-th antenna is given by:

$$y_l(k) = \sum_{n=0}^{\infty} x_l(n) f_{Tx}^{(l)}(k-n), \quad (4)$$

where $|y_l(k)|$, which is the absolute of $y_l(k)$, is not a constant for all values of k. For a flat MIMO channel, the baseband signal received by at antenna 103 with antenna number j will be given by $$v_j(k) = \sum_{l=1}^{N} h_{jl} \sum_{n=0}^{\infty} x_l(n) f_{Tx}^{(l)}(k-n) + n_j(k), \quad (5)$$

where $h_{jl}$ corresponds to the j-th row and l-th column element of the matrix H with CSI (channel state information), and $n_j(k)$ is the j-th entry of the additive noise vector $n_k$. In order to retrieve the signal from the first transmitting antenna, the received signals are filtered using filter 104 with impulse response $g_{Rx}^{(l)}(n)$ ($=1/f_{Tx}^{(l)}(n)$), which is an inverse of $f_{Tx}^{(l)}(n)$. Thus, the signal received from each antenna after removing the tag associated with the first signal may be expressed as:

$$u_{1,j}(k) = \sum_{m=0}^{N_R-1} v_j(k-m) g_{Rx}^{(1)}(m), \quad (6)$$

where NR is the length of the impulse response $g_{Rx}^{(l)}(n)$. In general, $g_{Rx}^{(l)}(n)$ is designed such that $$\sum_{n=0}^{N_R-1} f_{Tx}^{(l)}(k-n) g_{Rx}^{(l)}(n) \approx \delta(k-D), \quad (7)$$

where, δ(n) is the Kronecker delta represented by $$\delta(n) = \begin{cases} 1, & \text{if } n=0 \\ 0, & \text{otherwise}, \end{cases} \quad (8)$$

and D is a delay that arises from the non-minimum phase of the TT-Filter (tagging filter). From Eq. (6), we can therefore say that as the order of the maximum-phase portion of filter $f_{Tx}^{(l)}(n)$ increases, the delay D will also increase.

In such an OFDM system, the unique tagging filter can be placed in position marked by <1> in FIG. 2, at the transmitter. FIG. 2 illustrates the configuration of an OFDM-MIMO transmitter. Assuming that N is an integer equal to or larger than 2, this transmitter sends data using N pieces of transmitting antennas #1 to #N. Hereinafter, a transmitting antenna with antenna number of j, that is, the j-th transmitting antenna is represented as "transmitting antenna #j."

The transmitter includes: channel coder 111 for performing channel coding of a binary input signal; S/P convertor 112 for performing serial-to-parallel conversion for the channel-coded signal to map the data to each antenna; S/P convertors 113 for performing serial-to-parallel conversion for the data, for each output of S/P convertor 112, to map the data to subcarriers; IFFT units 114 which are provided for each S/P convertor 113 and perform inverse fast Fourier transform for the parallel data from the corresponding SIP convertor 113; P/S convertors 115 which are provided for each IFFT unit 114 and convert the parallel output of the corresponding IFFT unit 114 to a serial signal; CP adding units 116 which are provided for each P/S convertor 115 and add a cyclic prefix (CP) to the data; tagging filters 117 provided at the outputs of CP adding units 116 as the position <1> described above; and signal processors 118 provided at the outputs of tagging filters 117 to perform signal processing for transmission.

In this transmitter, S/P convertor 112 for performing the antenna mapping has N pieces of outputs. S/P convertor 113 for performing the subcarrier mapping, IFFT unit 114, P/S convertor 115, CP adding unit 116, tagging filter 117 and signal processor 118 for transmission are cascaded in this order and connected to each output of S/P convertor 112. The output of each signal processor 118 is supplied to the corresponding transmitting antenna of transmitting antennas #1 to #N.

Here, processing such as scrambling, CRC (cyclic redundancy code), FEC (forward error correction), interleaving and modulation is carried out in channel coder 111. Processing such as up-sampling, filtering by a band filter, predistortion, amplification is carried out in signal processor 118.

In such a transmitter, the position of the tagging filters is not limited to position <1>. It is possible to relocate the tagging filters at position <2>, i.e., position of outputs of IFFT units 114, or position <3>, i.e., position of outputs of S/P convertors 113, or position <4>, i.e., position of outputs of S/P converter 112.

At the receiver, inverse tagging filters will be designed such that they satisfy Eq. (7) and Eq. (8) described above. The position of these inverse tagging filters is shown in FIG. 3. FIG. 3 illustrates an example of configuration of a receiver in the OFDM-MIMO system.

The receiver shown in FIG. 3 is provided with N pieces of receiving antennas 103. The receiver includes: analog processors 1 which are provided for each receiving antenna 103 and perform amplification, modulation, analog-to-digital conversion and the like of the received signal; digital processors 122 which are provided at the outputs of analog processors 1 and perform processing including fast Fourier transform (FFT); M pieces of inverse tagging filters 123; MIMO signal processor 124 which is supplied with signals from the M pieces of inverse tagging filters 123 and performs MIMO signal processing; P/S convertors 125 which are provided for each of M sets of parallel outputs from the MIMO signal processor 124 and convert the corresponding parallel output to a serial signal; P/S convertor 126 which is supplied with the outputs of respective P/S convertors 125 in parallel and converts these outputs to serial data; and channel demodulator 127 provided at the output of P/S convertor 126 to perform channel decoding and demodulation. Each of N pieces of digital processors 122 includes M pieces of outputs which are inputted to any of M pieces of inverse tagging filters 123. Therefore, any inverse tagging filter 123 is supplied with the outputs from the M pieces of digital processors 122.

Each digital processor 122 performs processing such as OFDM frame synchronization, down-sampling, removal of the cyclic prefix, and fast Fourier transform (FFT). P/S convertor 125 may or may not be provided with a deinterleaving matrix. If P/S convertor 125 includes the deinterleaving matrix, P/S convertor 125 performs the interleaving based on the deinterleaving matrix. P/S convertor 126 performs demapping of the data from the antennas.

However, the following problems need to be solved in the MIMO system based on tagging filters:

(1) For explanation purposes, consider a case where second order allpass filters are used, and that all the poles of the filters are located at a radial distance of 0.5 from the center (origin) of a complex plane (z-plane). As illustrated in FIG. 4A, when there are two sources or antennas, the maximum separation ($P_s$) between the poles of these two sources will be "1". As illustrated in FIG. 4B, when there are eight sources or antennas, the maximum separation between two poles will be $|0.25\sqrt{2}(1+i)-0.5|=0.3827$. Thus, as the number of sources increases, the similarity between two filters whose poles are adjacent to each other will also increase. Differentiating signals which have been tagged using filters, whose poles are located close to each other, will therefore become increasingly difficult. The increase in order will imply an increase in the number of multipliers and hence the system's complexity will be also increased, which increases the system's in cost.

(2) Similarly, as the order of an allpass filter increases, the delay associated with its inverse function will also increase. Such a long delay is not preferable for systems used in delay sensitive applications. Example of such a delay sensitive system includes equipment such as unmanned space crafts which are controlled remotely. The delay may also causes an annoyance during conversation by voice call, if it exceeds a certain threshold acceptable to humans.

It should be noted that the present inventor has proposed a system having a plurality of antennas or sources in which each source is filtered by a unique filter, in PCT publication WO2006/059767 [A1].

Japanese Patent Laid-open Application No. 2000-286821 (JP-2000-286821A) [A2] discloses an OFDM communication device which uses a small number of pilot symbols to compensate receiving distortion due to variation in multipath fading in a transmission path (channel) and is capable of reducing transmission path estimation error due to noise. This device uses a filter having an inverse characteristic for the characteristic of the transmission path, filters a signal corresponding to the channel state information and obtains the channel state information in the time domain by multiplying the pilot data by a signal after FFT.

Japanese Patent Laid-open Application No. 2002-111756 (JP-2002-111756A) [A3] discloses a radio communication system in which filters are provided within both the transmitter and receiver and which performs fading distortion compensation suitable for a propagation environment thereby reducing the bit error rate. In this communication system, a bandwidth of a signal is restricted before transmission by a filter having a bandwidth narrower than the maximum bandwidth of the input signal.

Japanese Patent Laid-open Application No. 2005-318117 (JP-2005-318117A) [A4] discloses a closed-loop type MIMO transmission system in which data transmission is carried out by selecting different coding rates and different modulation schemes among transmitting and receiving antennas and streams. In this system, a scrambler is used for mapping data to the different antennas.

Japanese Patent Laid-open Application No. H05-219488 (JP-5-219488A) [A5] discloses a system for transmitting and receiving a motion picture signal in which an interleaver and a scrambler are disposed in a transmitter and a deinterleaver and a descrambler are disposed in a receiver. In this system, the transmission signal is subjected to an interleaving process and a scrambling process before NRZI (non-return-to-zero inversion) conversion, which is regarded as one kind of modulation, is performed.

Japanese Patent Laid-open Application No. H11-215091 (JP-11-215091A) [A6] describes an OFDM signal transmission system in which a transmission data sequence is subjected to a scrambling process or an interleaving process at a transmitter before modulation and a signal after demodulation is subjected to a descrambling process or a deinterleaving process at a receiver.

In the following, references referred to in this description are enumerated:

[A1] WO2006/059767
[A2] JP-2000-286821A
[A3] JP-2002-111756A
[A4] JP-2005-318117A
[A5] JP-5-219488A
[A6] JP-11-215091A
[B1] G. J. Foschini and M. J. Gans, "On limits of wireless communications in a fading environment when using multiple antennas," Wireless Personal Communications, Vol. 6, pp. 311-335, 1998.
[B2] A. Goldsmith, S. A. Jafar, N. Jindal and S. Vishwanath, "Capacity limits of MIMO channels," IEEE Journal on Selected Areas in Communications, Vol. 21, No. 5, pp. 684-702, June 2003.
[B3] Y. Ogawa, K. Nishio, T. Nishimura and T. Ohgane, "A MIMO-OFDM system for high-speed transmission," 2003 IEEE 58th Vehicular Technology Conference, Vol. 1, pp. 493497, 2003.
[B4] H. Yang, "A road to future broadband wireless access: MIMO-OFDM-based air interface," IEEE Communications Magazine, Vol. 43, No. 1, pp. 53-60, January 2005.
[B5] A. Belouchrani and M. G. Amin, "Blind source separation based on time-frequency signal representations," IEEE Transactions on Signal Processing, Vol. 46, No. 11, pp. 2888-2897, November 1998.
[B6] T. L. Marzefta, "BLAST training: Estimating channel characteristics for high capacity space-time wireless," Proceedings of 37th Annual Allerton Conference on Communication, Control, and Computing, pp. 958-966, Sep. 22-24, 1999.
[B7] Y. Li and L. Yang, "Semi-blind MIMO channel identification based on error adjustment," Proceedings of IEEE International Conference on Neural Networks and Signal Processing, Vol. 2, pp. 1429-1432, Dec. 14-17, 2003.
[B8] Y. Li and K. J. R. Liu, "Adaptive blind source separation and equalization for Multiple-Input/Multiple-Output systems," IEEE Transactions on Information Theory, Vol. 44, No. 7, pp. 2864-2876, November 1998.
[B9] J. Okello and M. Ikekawa, "Tagging-filter based blind MIMO equalization without signal permutation," IEEE Globecom 2005, Vol. 4, pp. 2145-2149, November-December 2005.

[B10] W. Zhuang and V. Huang, "Channel preceding using phase distortion for slowly fading channels," Proceedings of Canadian Conference on Electrical and Computer Engineering, pp. 234-237, September 1994.

[B11] N. Maeda, Y. Kishiyama, H. Atarashi and M. Sawahashi, "Variable spreading factor-OFCDM with two dimensional spreading that prioritizes time domain spreading for forward link broadband wireless access," IEICE Trans. Commun., Vol. E88-B, No. 2, pp. 487-498, February 2005.

[B12] D. N. Godard, "Self-recovering equalization and carrier tracking in two-dimensional data communication systems," IEEE Transactions on Communications, Vol. 28, No. 11, pp. 1867-1875, November 1980.

[B13] K. N. Oh and Y. O. Chin, "Modified constant modulus algorithm: Blind equalization and carrier phase recovery algorithm," Proc. IEEE ICC, Vol. 1, pp. 498-502, June 1995.

[B14] A. van der Veen, "Statistical performance analysis of the algebraic constant modulus algorithm," IEEE Transactions on Signal Processing, Vol. 50, No. 12, pp. 3083-3097, December 2002.

[B15] P. A. Regalia, "A finite-interval constant modulus algorithm," Acoustics, Speech, and Signal Processing, 2002. Proceedings. (ICASSP '02). IEEE International Conference on, Vol. 3, pp. III-2285-III-2288, 13-17, May 2002.

[B16] J. G. Proakis, Digital Communications, McGraw Hill, 4th Edition, pp. 840-852.

DISCLOSURE OF THE INVENTION

Problem to be Solved by the Invention

It is an object of the present invention to provide a communications system in which the problem of permutation is solved without using training signals and increase in the order of tagging filters is reduced.

It is another object of the present invention to provide a multiple access method in which the problem of permutation is solved without using training signals and increase in the order of tagging filters is reduced.

It is a further of the present invention to provide a transmitter and a receiver for constructing a communications system in which the problem of permutation is solved without using training signals and increase in the order of tagging filters is reduced.

Means for Solving the Problem

According to a first exemplary aspect of the present invention, provided is a communications system including: a transmitter for transmitting signals over a transmission channel; and a receiver for receiving the signals, wherein the transmitter includes: a filter for filtering a modulated signal to modify amplitude and phase characteristics of the modulated signal; and first processing means for performing interleaving process and/or scrambling process for the filtered signal, and wherein the receiver include: second processing means for performing deinterleaving process and/or descrambling process for a received signal; and an inverse filter for filtering a signal supplied from the second processing means.

According to a second exemplary aspect of the present invention, provided is a transmitter for transmitting signals over a transmission channel, including: a filter for filtering a modulated signal to modify amplitude and phase characteristics of the modulated signal; and processing means for performing interleaving process and/or scrambling process for the filtered signal.

According to a third exemplary aspect of the present invention, provided is a receiver for receiving signals, including: processing means for performing deinterleaving process and/or descrambling process for a received signal; and an inverse filter for filtering a signal supplied from the processing means.

According to a fourth exemplary aspect of the present invention, provided is a multiple access method in a system which includes a transmitter for transmitting signals and a receiver for receiving the signals, the method including: assigning a tag uniquely to each transmitter, the tag comprising a combination of a filter and an interleaver and/or scrambling code, the tag being retrieved from a pool or a set; using the tag to process a signal of each transmitter or each source; and decoding, at a receiver with multiple receiving antennas or receiving sensors, a signal from each transmitting source or each transmitting antenna using an inverse filter and a deinterleaver and/or descrambler and based on a unique tag of the transmitter such that only signals from the transmitters having the same tag are regenerated.

According to a fifth exemplary aspect of the present invention, provided is a communications system according to an OFDM scheme, including the above-described transmitter with an interleaver, wherein the interleaver is configured to interleave a two-dimensional block of data with a row corresponding to a subcarrier index while a column corresponding to an OFDM symbol number, the interleaver performing interleaving in which, for each row, data within the row is permutated.

According to a sixth exemplary aspect of the present invention, provided is a communications system according to an OFDM scheme, including the above-described transmitter with an interleaver, wherein the interleaver is configured to interleave a two-dimensional block of data with a row corresponding to a subcarrier index while a column corresponding to an OFDM symbol number, the interleaver performing interleaving in which, for each row, data within the row is permutated and then order of rows is permutated.

BRIEF DESCRIPTION OF THE DRAWINGS

FIGS. 10A and 11B are constellation diagrams of the signals after modulation and mapping;

FIGS. 11A and 11B are constellation diagrams of the signals after filtering the modulated signals;

FIGS. 12A and 12B are constellation diagrams of the signals after scrambling with a BPSK (binary phase shift keying) scrambling code;

DESCRIPTION OF THE REFERENCE NUMERALS

101 Unique filter;
102 Transmitting antenna;
103 Receiving antenna;
104, 211 Filter;
105, 118 Signal processor;
111, 261 Channel coder;
112, 113, 201, 202 S/P convertor;
114, 204 IFFT unit;
115, 125, 126, 244, 245 P/S convertor;
116 CP adding unit;
117 Tagging processor;
121 Analog processor;
122 Digital processor;
123 Inverse tagging filter;
124, 243 MIMO signal processor;
127, 246 Channel demodulator;
203 Tagging unit;
212 Interleaver;
213 Scrambler;
231 Pseudorandom binary code generator;
232 BPSK modulator;
233 Delay element;
234 Copier;
241 Preprocessor;
242 Inverse tagging unit;
251 Scrambling code generator;
252 Multiplier;
253 Deinterleaver;
254 Inverse filter;
262 Matrix combiner;
263 Transmission processor;
301 Transmitter; and
302 Receiver

BEST MODE FOR CARRYING OUT THE INVENTION

In an exemplary embodiment of the present invention, a MIMO system configured as a communications system is constituted by a transmitter, a receiver and a MIMO channel between the transmitter and the receiver.

Figure 5:
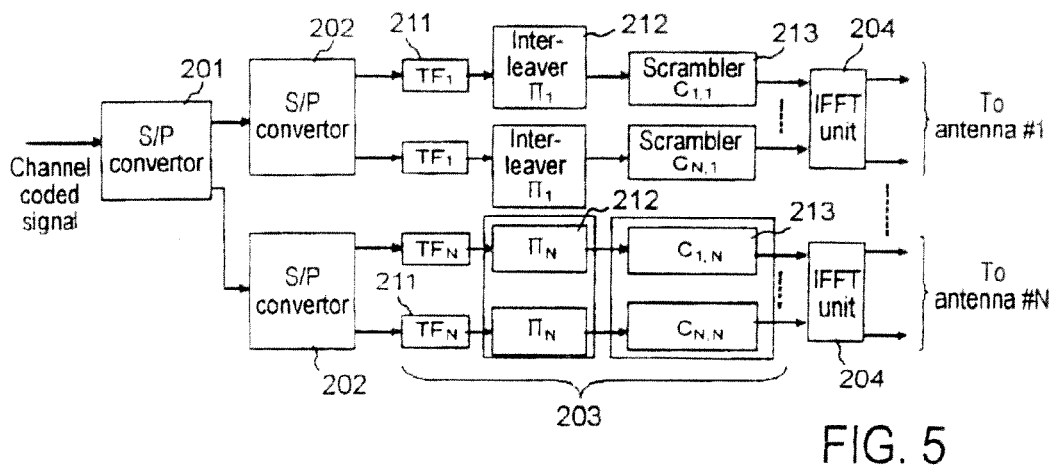
FIG. 5 is a block diagram showing an OFDM-MIMO transmitter based on the tagging filter that includes a filter, and an interleaver and/or a scrambler.

FIG. 5 shows a model of a transmitter for an OFDM-MIMO system. For explanation purpose, an OFDM based system is considered here, but the same approach can be naturally applied to non-OFDM based MIMO systems, if the channel is not frequency selective.

Figure 1:
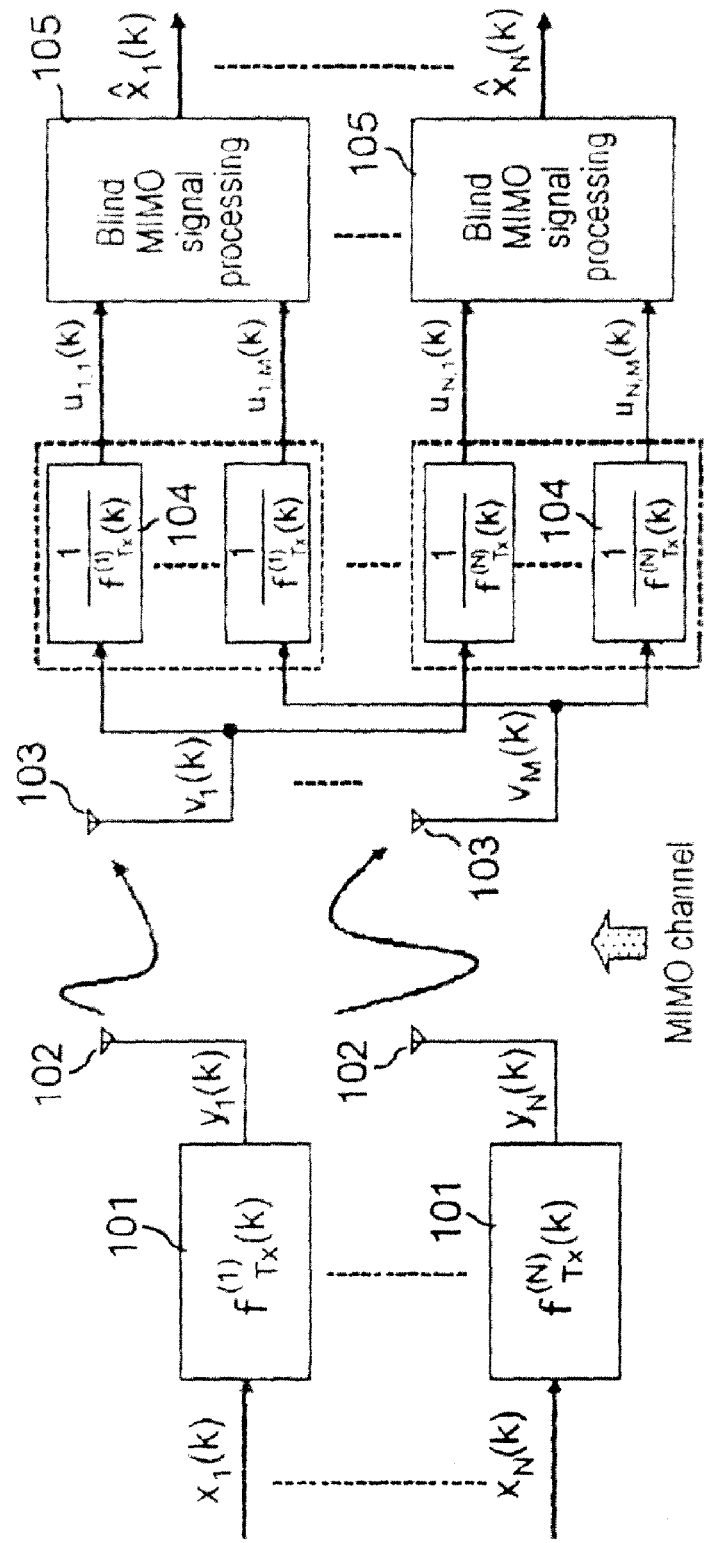
FIG. 1 is a block diagram showing a generalized baseband model for a tagging filter based multiple input multiple output (MIMO) system.
Figure 2:
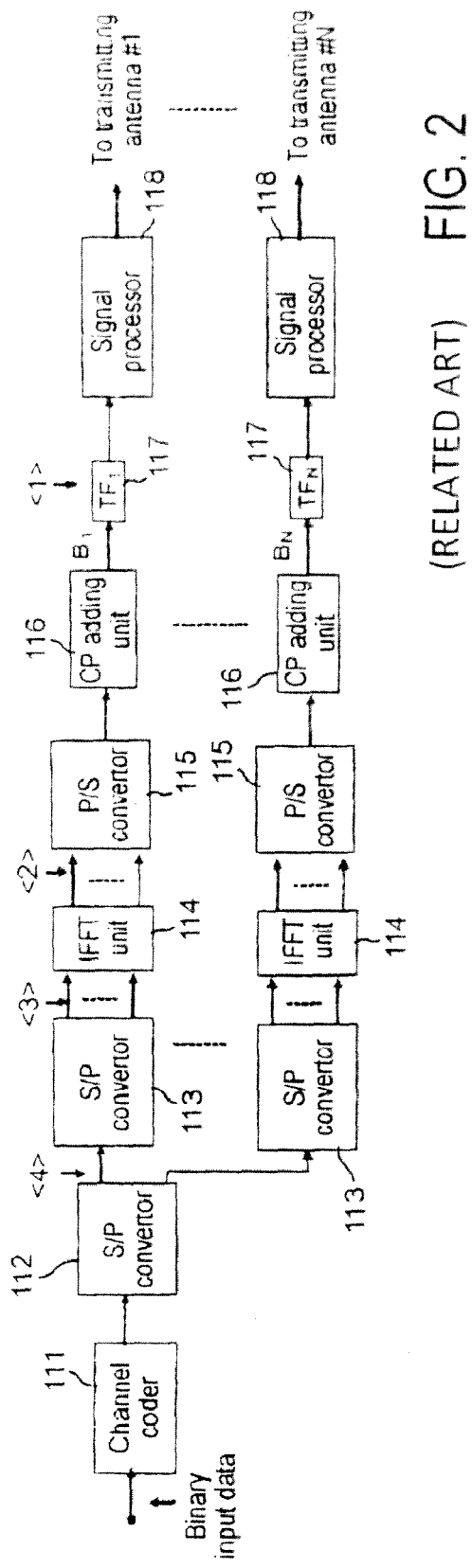
FIG. 2 is a block diagram showing an example of an OFDM-MIMO transmitter based on the tagging filter.

Assuming that N is an integer equal to or larger than two, the transmitter shown in the figure is configured to receive a channel coded signal as an input signal and transmits signals from N pieces of transmitting antenna. The transmitter includes: S/P convertor 201 for performing serial-to-parallel conversion for the channel-coded signal to map the data to each antenna; S/P convertors 202 for performing serial-to-parallel conversion for the data, for each output of S/P convertor 201, to map the data to subcarriers; tagging units 203 for tagging the parallel data from respective S/P convertors 202; and IFFT units 204 for performing inverse fast Fourier transform for the tagged parallel data. The output data from IFFT units 204 are send to the corresponding transmitting antennas as the case of the transmitter shown in FIG. 2. N pieces of S/P convertors 202 and N pieces of IFFT units 204 are provided in accordance with the number of the transmitting antennas. Each S/P convertor 202 may or may not be provided with an interleaving matrix.

Tagging unit 203 has a structure in which filter 211, interleaver 212 and scrambler 213 are serially connected in this order for each output of each S/P convertor 202. The output of scrambler 213 is supplied to corresponding IFFT unit 204. As described later, the arrangement of interleaver 212 and scrambler 213 may be inverted from the arrangement shown here. Alternatively, one of interleaver 212 and scrambler 213 may be omitted.

In FIG. 5, a signal to be transmitted, i.e., the channel coded signal, could have been encoded by scrambling, channel coding, interleaving and modulation. Therefore, the signal to be transmitted is referred to as "modulated signal." This modulated signal is first converted from a serial data to N streams of parallel data using arbitral serial-to-parallel data conversion technique in S/P convertor 201. Once the signal stream has been divided to N streams, i.e., antenna mapping has been performed, each stream will be further divided into $N_{SC}$ streams by corresponding S/P convertor 202. Here, $N_{SC}$ corresponds to the number of subcarriers that are used for OFDM. Note that, as in the method of the related arts, $N_{SC}$ need not correspond to the size ($N_{IFFT}$) of the IFFT (inverse fast Fourier transform) since null subcarriers can be used as a guard band. As explained earlier, serial-to-parallel conversion for the IFFT subcarriers can be done using any method that may also involve spreading [B11].

After data has been mapped to each of the allocated subcarriers, the data shall be filtered with filter 211 (tag filter $TF_l$), where the subscript "l" corresponds to the index of transmitting antennas. Therefore, l=1,2, . . . , N. In comparison to a case illustrated in [B9], filter $TF_l$ need not be different from filter $TF_{l'}$. To differentiate the unique filters from non-unique filters, we define the unique filters as $TF_1^{(u)}$, . . . , $TF_{N_{TF}}^{(u)}$, where $N_{TF}$ is the number of unique filters. By uniqueness, each filter has unique phase characteristics and/or amplitude characteristics such that $TF_i^{(u)} \ne TF_j^{(u)}$ for all i, j (i≠j).

Figure 6:
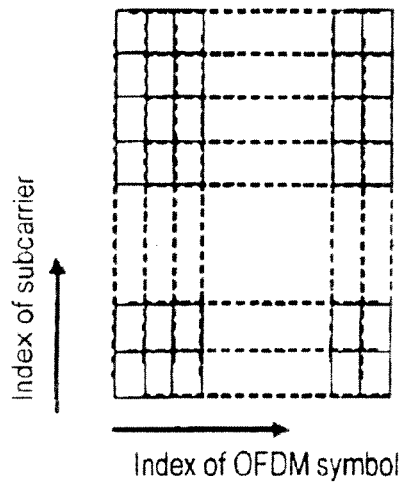
FIG. 6 is an illustration of a block of data for interleaving.

After filtering the signal, the signal will then be interleaved at unique. interleaver $\Pi_l$, i.e., interleaver 211, in the following manner:

(1-a) Create a block of data for interleaving. The block of data has an index corresponding to a symbol number of an OFDM symbol, and another index corresponding to the index of the subcarriers that will be used for transmission. For explanation purpose, it is assumed that the raw index, which is an index in the horizontal direction, corresponds to the symbol number, while the column index, which is an index in the vertical direction, corresponds to the subcarriers. An example of this kind of indexing is illustrated in FIG. 6.

Figure 7:
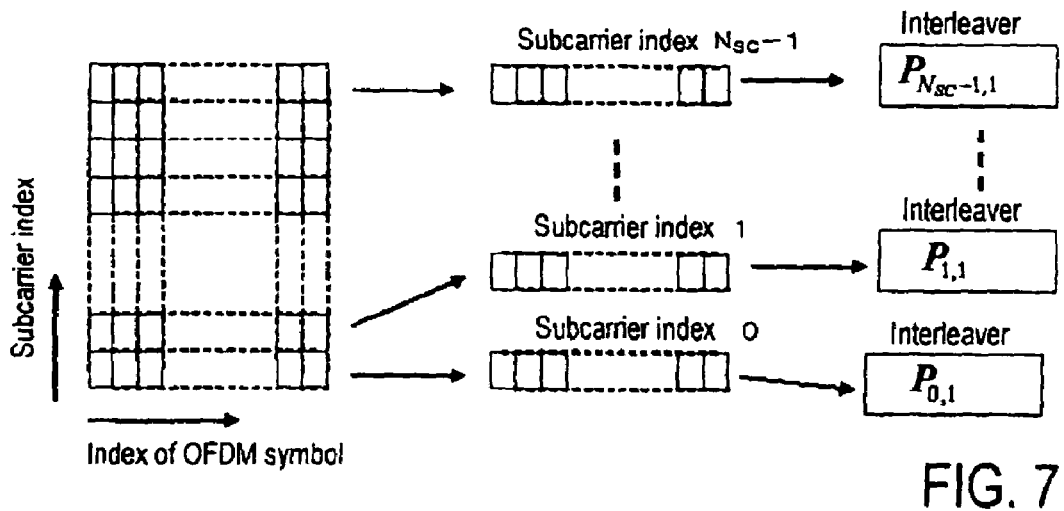
FIG. 7 is an illustration of intra-subcarrier interleaving for the case of an antenna having an antenna number of 1.

(1-b) For each subcarrier, interleave the symbols using an interleaving pattern $P_{c,l}$, where c is the subcarrier index, while l is the index of the antenna. The interleaving pattern $P_{c,l}$ shall be designed such that $P_{c,i} \ne P_{c,j}$ for all c and all i, j (i≠j). FIG. 7 illustrates the intra-subcarrier interleaving for the case where the antenna number is 1, i.e., l=1. Note that in a single carrier system, $N_{SC}$ is 1, hence c=0.

(1-c) It is also possible to interchange the positions of the subcarriers from c to c'. The interchanging of the indices must however be done in such a way that the new indices satisfies (1-b) above. Note that this interchanging of the indices is not always necessary.

A unique interleaver $\Pi_l$ is an interleaver designed such that a combined interleaver defined in (1-b) and (1-c) above results in a permutation that is different for each of corresponding subcarriers of the transmitting sources or antennas.

The interleaved data is then scrambled by scrambler 213 with a random scrambling code that is described on a block of interleaved data. As in the case of the interleaver described above, this block of data has a horizontal axis corresponding to the symbol index and a vertical axis corresponding to the index of the subcarriers allocated for transmission. The scrambling code of an antenna or a source is defined for each subcarrier using $C_{c,l}(k)$, where c is the subcarrier index, k is an index of an OFDM symbol, and l is an index of an antenna, such that $C_{c,i} \ne C_{c,j}$ for all c and all i, j (i≠j). A scrambling code for antenna #1 is then described as $$C_l(k) = \begin{bmatrix} C_{0,l}(k) \\ \vdots \\ C_{N_{SC}-1,l}(k) \end{bmatrix}. \quad (9)$$

Figure 8:
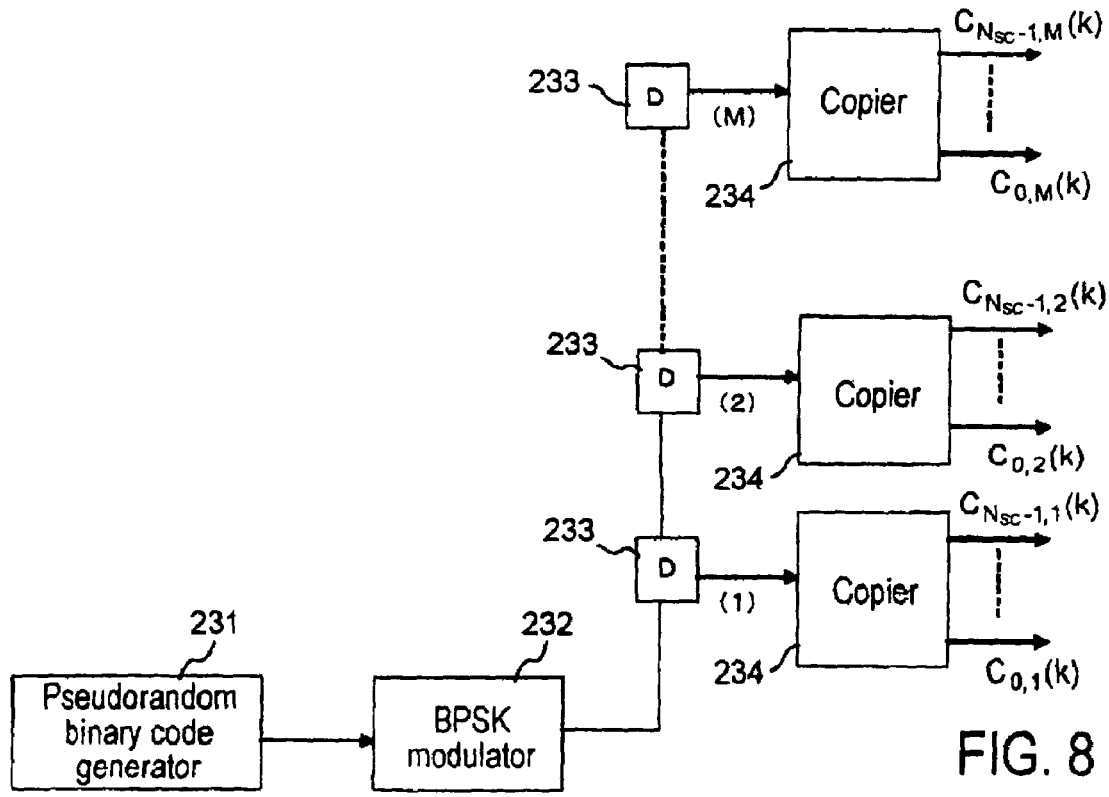
FIG. 8 is a view showing a simple way of generating scrambling codes for the tag of each antenna or each multiple input system.

In the transmitter, since a tag which is uniquely established for each transmitting antenna or each source is defined in tagging unit 203 as a combination of a filter, an interleaver and a scrambling code, at least one of these three items in each tag must be different for the tags to qualify as unique tags. FIG. 8 shows one of the ways which can generate deferent scrambling codes for each antenna or each input of a multiple input system.

In FIG. 8, a single pseudorandom binary code generator 231 is used. After modulation using BPSK modulation scheme, the random code is delayed so as to generate a code for each of the inputs of a multiple input system. In the example in FIG. 8, M pieces of delay elements (D) 233 are serially connected to the output of BPSK modulator 232 which performs BPSK modulation for the pseudorandom number sequence generated by pseudorandom binary code generator 231. When the delay is not zero, the resulting scrambling codes are unique to each of the antennas or each of the sources. The simple code that is generated in this example satisfies the condition $C_{0,l} = C_{1,l} = \ldots = C_{N_{SC}-1,l}$. The codes which have been generated are copied to the $N_{SC}$ pieces of subcarriers by copiers 123 which are provided for respective delay elements 233, and then multiplied with interleaved data symbols that have been mapped to the respective subcarriers.

Figure 9:
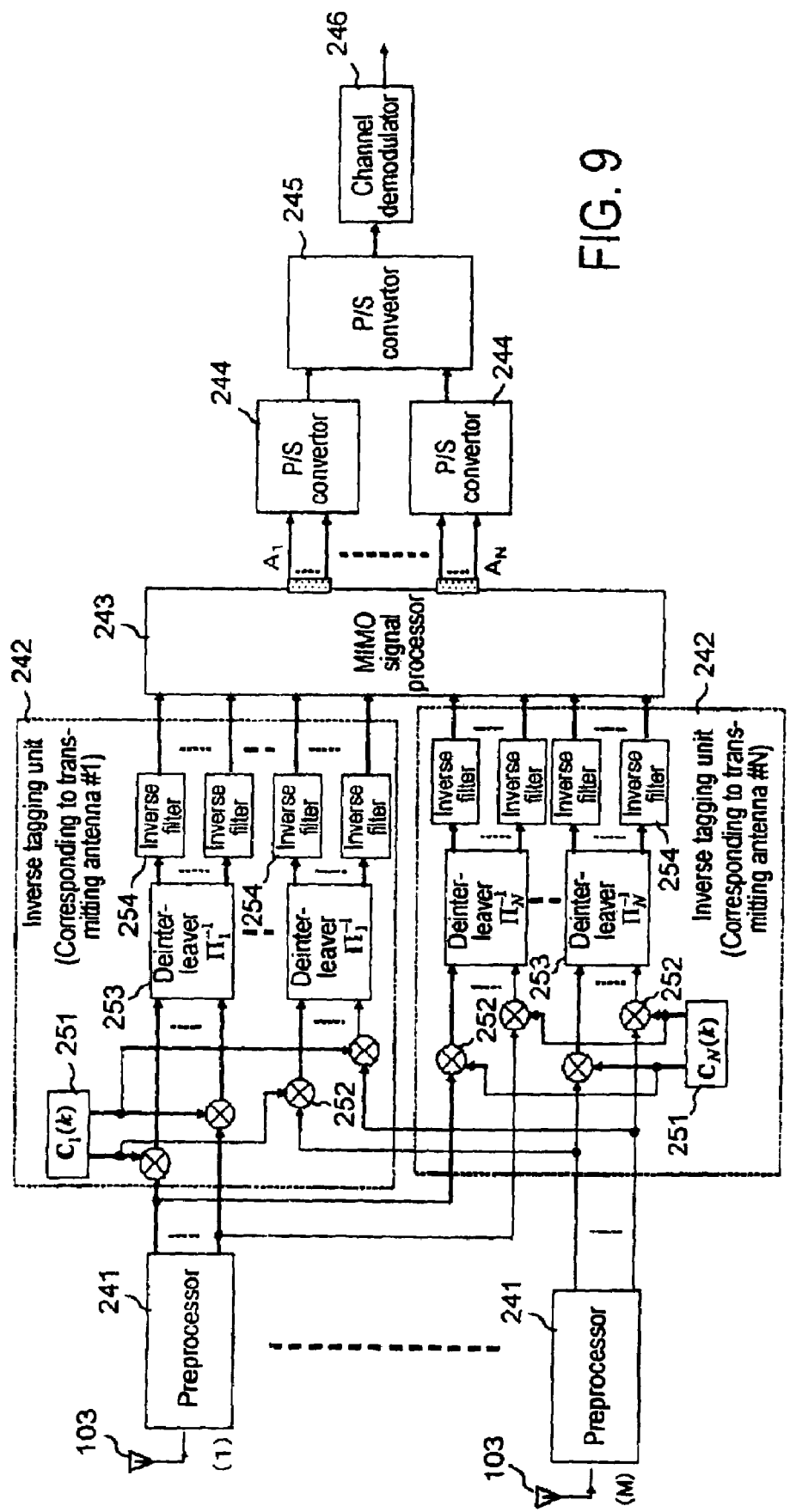
FIG. 9 is a block diagram showing a receiver with M pieces of receiving antennas for separating N pieces of signals that have been tagged and transmitted using N pieces of transmitting antennas.

Next, the receiver will be explained. In this exemplary embodiment, a tag corresponding to the input (antenna) number "1" of the transmitter is used to retrieve at the receiver the signal that has been transmitted through the input (antenna) number "1." FIG. 9 illustrates an example of a receiver with M pieces of receiving antennas for separating N pieces of sources that have been transmitted using N pieces of transmitting antennas. Here, it is assumed that N≧M.

The illustrated receiver includes: preprocessors 241 provided for each receiving antenna 103; N pieces of inverse tagging units 242 each of which receives signals from M pieces of preprocessors 241; MIMO signal processor 243 for performing MIMO signal processing for the signals from the N pieces of inverse tagging units 242; P/S convertors 244 which are provided for each of M sets of parallel outputs from MIMO signal processor 243 and convert the corresponding parallel output to a serial signal; P/S convertor 245 for receiving the outputs of respective P/S convertors 244 in parallel to convert these outputs to serial data; and channel demodulator 246 which is provided at the output of P/S convertor 245 and performs channel decoding and demodulation. The N pieces of inverse tagging units 242 correspond to N pieces of transmitting antennas, respectively. Preprocessors 241 perform processing such as amplification, demodulation, analog-to-digital conversion, OFDM frame synchronization, down-sampling, removal of a cyclic prefix, fast Fourier transform (FFT) for the received signal which has been received at the receiving antenna. P/S convertor 244 may or may not be provided. with a deinterleaving matrix. P/S convertor 245 performs demapping of data from the antennas.

Inverse tagging unit 242 corresponding to the l-th transmitting antenna is configured to perform a process corresponding to the inverse of tagging which has been performed associated with the l-th transmitting antenna at the transmitter. This inverse tagging unit includes: code generator 251 for generating scrambling code $C_l(k)$ which is the same as a scrambling code which has been used for the l-th transmitting antenna; multipliers 252 for multiplying the signal from each preprocessor 241 by scrambling code $C_l(k)$ to perform descrambling; deinterleavers 253 for deinterleaving the signals descrambled by multipliers 252; and inverse filters 254 for filtering the deinterleaved signals. Multipliers 252 function as descramblers.

In this example, if we are interested in the signal that has been transmitted using antenna number "1," each signal from each of the receiving antennas will be descrambled using the scrambling code $C_1(k)$. This will be followed by the processing by deinterleaver 253 and inverse filter 254. In this case, inverse filter 254 and the deinterleaver 253 correspond to filter 211 and interleaver 212 of the tag associated with antenna number "1," respectively. In other words, deinterleaver 253 performs the inverse operation $\Pi_1^{-1}$ of operation $\Pi_1$ which is performed by interleaver 212. Inverse filter 254 has inverse filter characteristics of filter 211.

Figure 3:
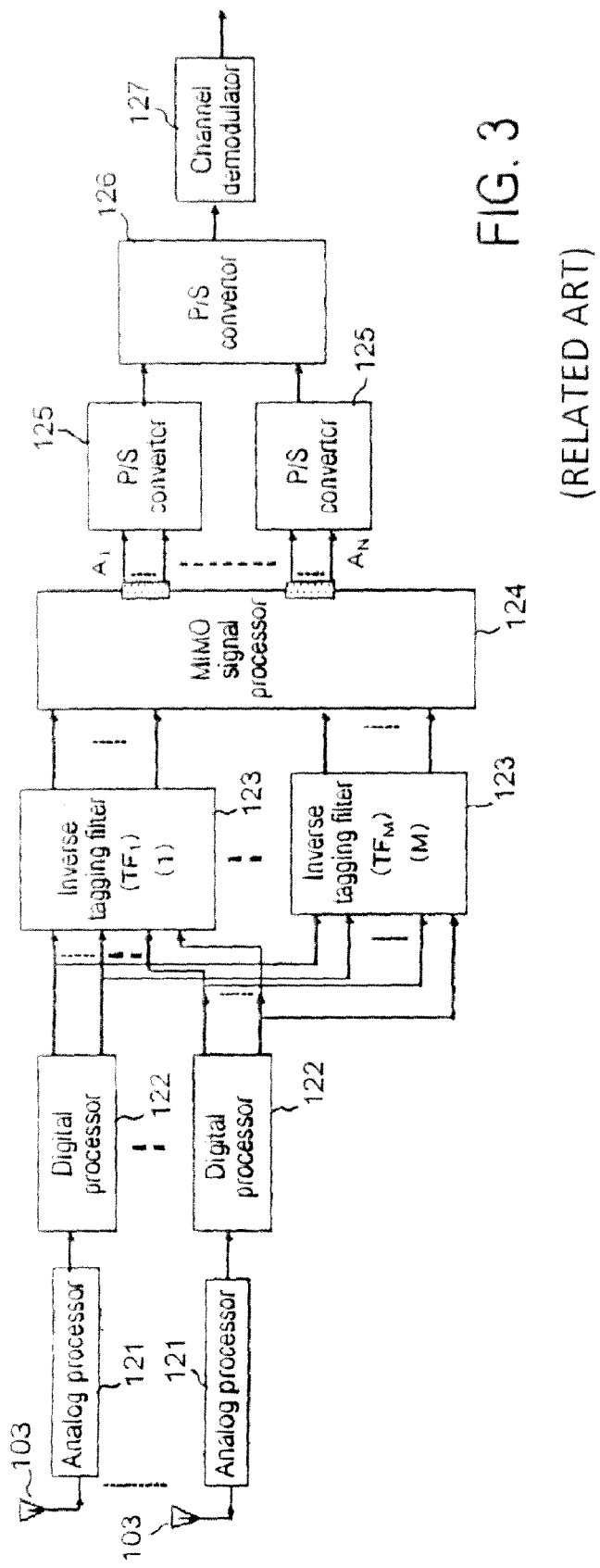
FIG. 3 is a block diagram showing an example of an OFDM-MIMO receiver based on the tagging filter.
Figure 4A:
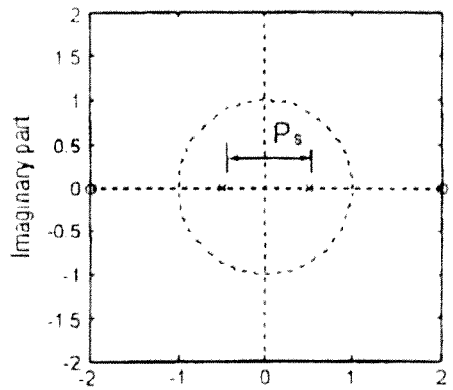
FIGS. 4A and 4B are graphs showing examples of pole and zero location in an allpass filter based on the tagging filter for the cases of the number of sources being two and eight, respectively.
Figure 4B:
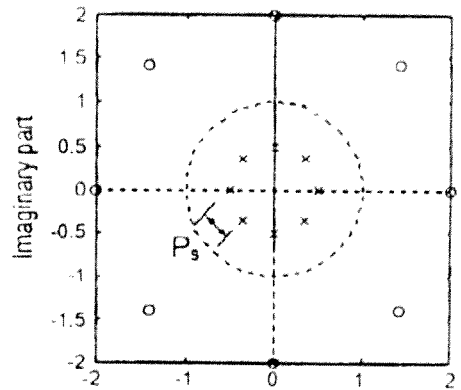

After filtering, an adaptive algorithm for separating signals based on the property of the originally transmitted signals is then applied to the signals from inverse filters 254 at MIMO signal processor 243. As an example, if the original signal is a QPSK signal, any one of the well known constant modulus algorithms [B12]-[B15] can be applied to retrieve only the signal that has been transmitted from antenna #1. Thereafter, signals are outputted through P/S convertors 244, 245 and channel decoder 246 as is the receiver in the related art shown in FIG. 3.

The operation in this communications system will be described in detail.

For explanation purpose, it is assumed that there are two transmitting (Tx) antennas, and that after mapping of data to antennas and subcarriers by serial-to-parallel conversion, the signal is a QPSK signal, whose original property before tagging is its constant modulus nature. Constant modulus refers to a signal whose absolute value is constant irrespective of the symbol, which can be assumed to be random. FIG. 10 shows constellation diagrams of the signals at the transmitter after serial-to-parallel data mapping of the subcarriers for each transmitting antenna. The constellation diagram is a diagram illustrating where the signal points are disposed on a plane which takes a horizontal axis for in-phase components (I) and a vertical axis for quadrature components (Q).

As explained above, the tag for each of the two transmitting antennas consists of a filter, an interleaver and a scrambling code. Therefore, a unique tag can therefore be created by changing only the scrambling code. In this case, the scrambling code is a BPSK modulated signal. For explanation purpose, it is assumed that two tags, $Tag_1=\{TF_1^{(u)}\ \Pi_1\ C_1\}$ and $Tag_2=\{TF_2^{(u)}\ \Pi_2\ C_2\}$ are used. These tags $Tag_1$ and $Tag_2$ corresponds to antenna number "1" and antenna number "2," respectively, i.e., transmitting antenna #1 and transmitting antenna #2. In this example, $TF_1^{(u)}$ is an allpass filter which is defined as $$TF_1^{(u)} = \frac{0.5 + z^{-1}}{1 + 0.5z^{-1}}. \tag{10}$$

FIG. 11 shows the constellation diagrams of the two QPSK signals after filtering using the same filters that constitute their unique tags. It can be noticed that the filtering destroys the constant modulus property of the QPSK signals because the signal points are dispersedly distributed in the figures.

After filtering, the filtered data is interleaved in this exemplary embodiment. Since interleaving merely changes the subcarriers and symbols on which a QPSK signal will be transmitted, no change in the constellation diagrams is expected.

FIG. 12 shows the constellation diagrams after scrambling the two interleaved signals with scrambling code $C_1$, $C_2$ which are modulated by BPSK. Note that in this example, the signal is not spread and, as a result, signal separation using the known CDMA dispreading and signal search technique cannot be applied.

Figure 13A:
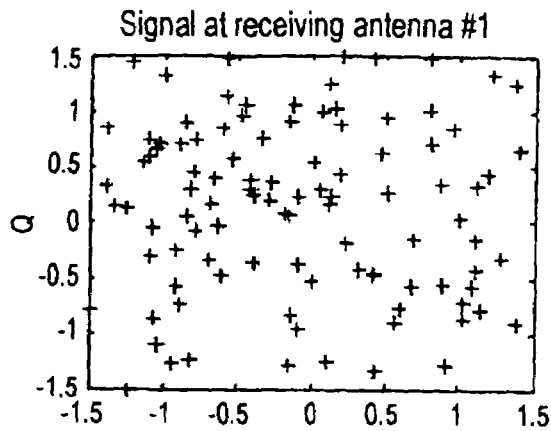
FIGS. 13A and 13B are constellation diagrams of the signals received by two receiving antennas.
Figure 13B:
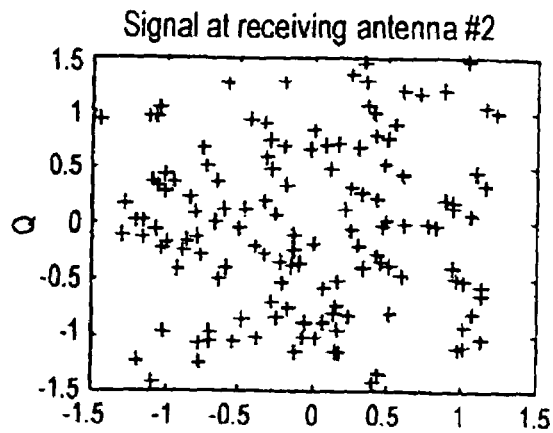
Figure 14A:
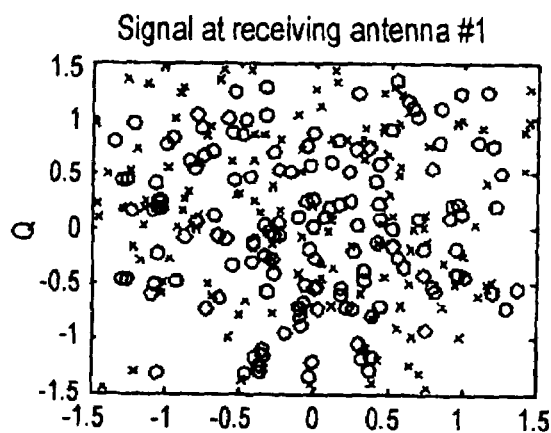
FIGS. 14A and 14B are constellation diagrams of the signals received by the two receiving antennas, with the two mixed signals shown using "o" and "x"
Figure 14B:
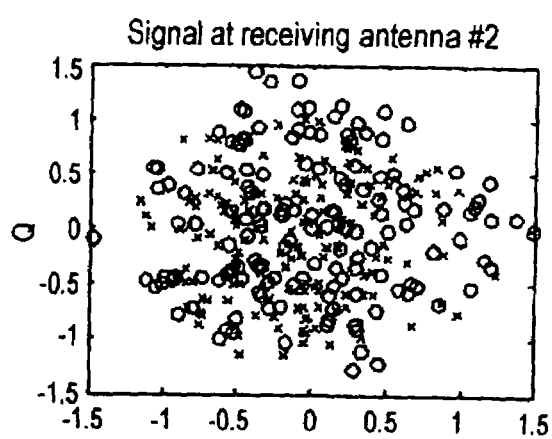

The constellation diagrams of the received signal when it is modeled by Eq. (1) are shown in FIG. 13. At this point, the signal presented in FIG. 13 consists of a summation of the two signals which are described as "o" and "x" in FIG. 14. Note that due to the characteristics of a MIMO channel or MIMO medium, the signal from transmitting antenna #1 (or transmitting antenna number #2) is received by both the receiver (Rx) antennas, but mixed up in additive manner. FIG. 14 shows the constellations of the signals from each of the receiving antennas, i.e., receiving antenna #1 and receiving antenna #2, after descrambling with a BPSK code $C_1$.

Figure 15A:
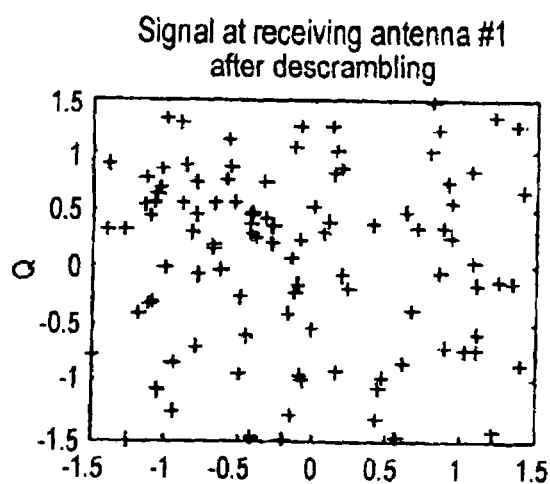
FIGS. 15A and 15B are constellation diagrams of the received signals after descrambling.
Figure 15B:
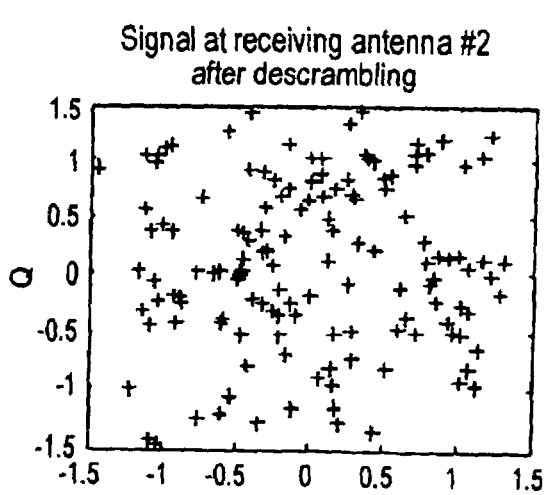
Figure 16A:
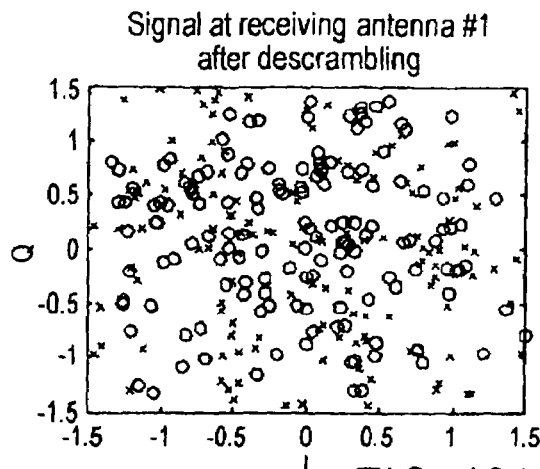
FIGS. 16A and 16B are constellation diagrams of the received signals after descrambling, with the two mixed signals shown using "o" and "x"
Figure 16B:
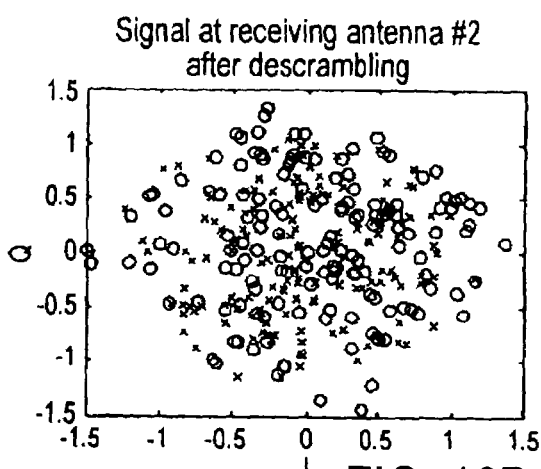

FIG. 15 shows the constellation diagrams of the received signal at the time point of the descrambling. Once again as in FIG. 13, the signal described in FIG. 15 is a summation of the signals described by "o" and "x" in FIG. 16.

Figure 17A:
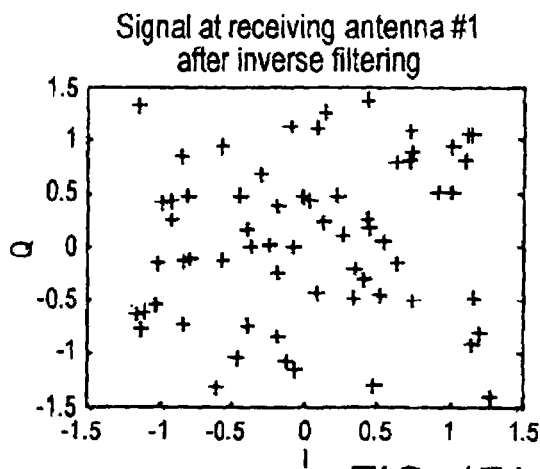
FIGS. 17A and 17B are constellation diagrams of the received signals after inverse filtering.
Figure 17B:
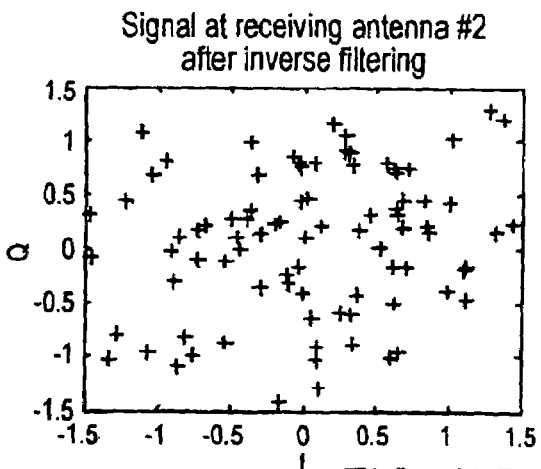
Figure 18A:
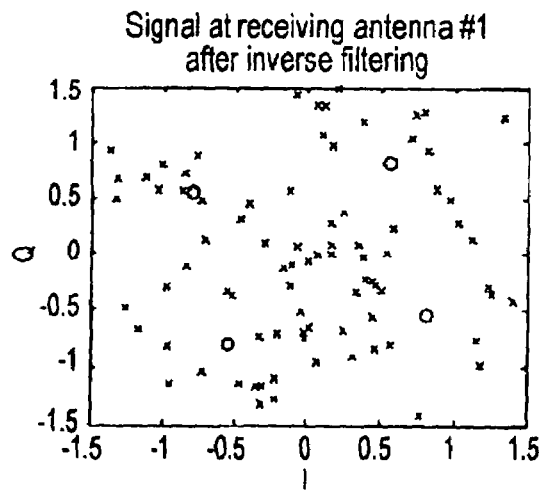
FIGS. 18A and 18B are constellation diagrams of the received signals after inverse filtering, with the two mixed signals shown using "o" and "x"
Figure 18B:
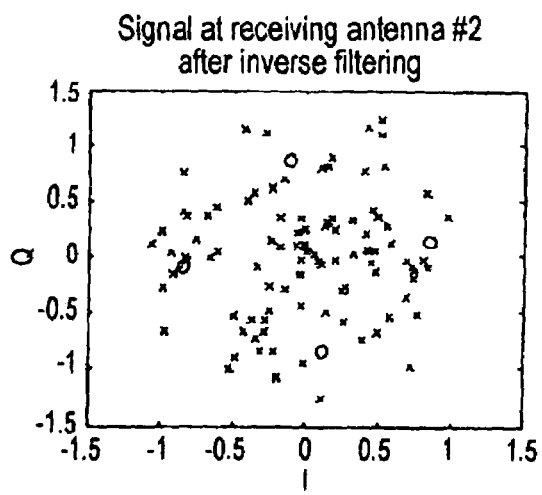

After deinterleaving and filtering using an inverse filter of the filter that has been used at the transmitter, a signal whose constellation diagram is shown in FIG. 17 can be obtained. This signal is composed of the signals described by "o" and "x" in FIG. 18. From FIG. 18, A can be seen that only the signal from transmitting antenna #1 which is indicated by "o" is converted back to a constant modulus signal. On the other hand, the signal that has been transmitted from transmitting antenna #2 does not have a constant modulus property.

This will be achieved, even if the same filter and the same interleaver are used. Therefore, for a given number of antennas, it is not necessary to use only the filters that are unique to each antenna. Filters can be shared resulting in a reduced number of sets of filters to be used in the tag. It therefore follows that the need of designing filters with very long impulse responses to use a large number of unique filters is eliminated, since a limited number of unique filters can be shared. Furthermore, it can be seen from Eq.(10) that designing filters with this kind of implementation will not require any multipliers. Also since the scrambling code is a BPSK modulated signal, scrambling and descrambling will also not involve any multiplications.

The communications system described above is a system which includes: a transmitter for transmitting signals over a transmission channel; and a receiver for receiving the signals, wherein the transmitter includes: a filter for filtering a modulated signal to modify amplitude and phase characteristics of the modulated signal; an interleaver for interleaving an output of the filtered signal; and a scrambler for scrambling the interleaved signal, and wherein the receiver includes: a descrambler for descrambling a received signal; a deinterleaver for deinterleaving the descrambled signal; and an inverse filter for filtering the deinterleaved signal. Here, the inverleaver and the scrambler are examples of items which function as processing means for performing interleaving process and/or scrambling process for the filtered signal. Further, the descrambler and the deinterleaver are example of items which function as processing means for performing deinterleaving process and/or descrambling process for the received signal.

Next, a communications system according to another exemplary embodiment will be described.

Figure 19:
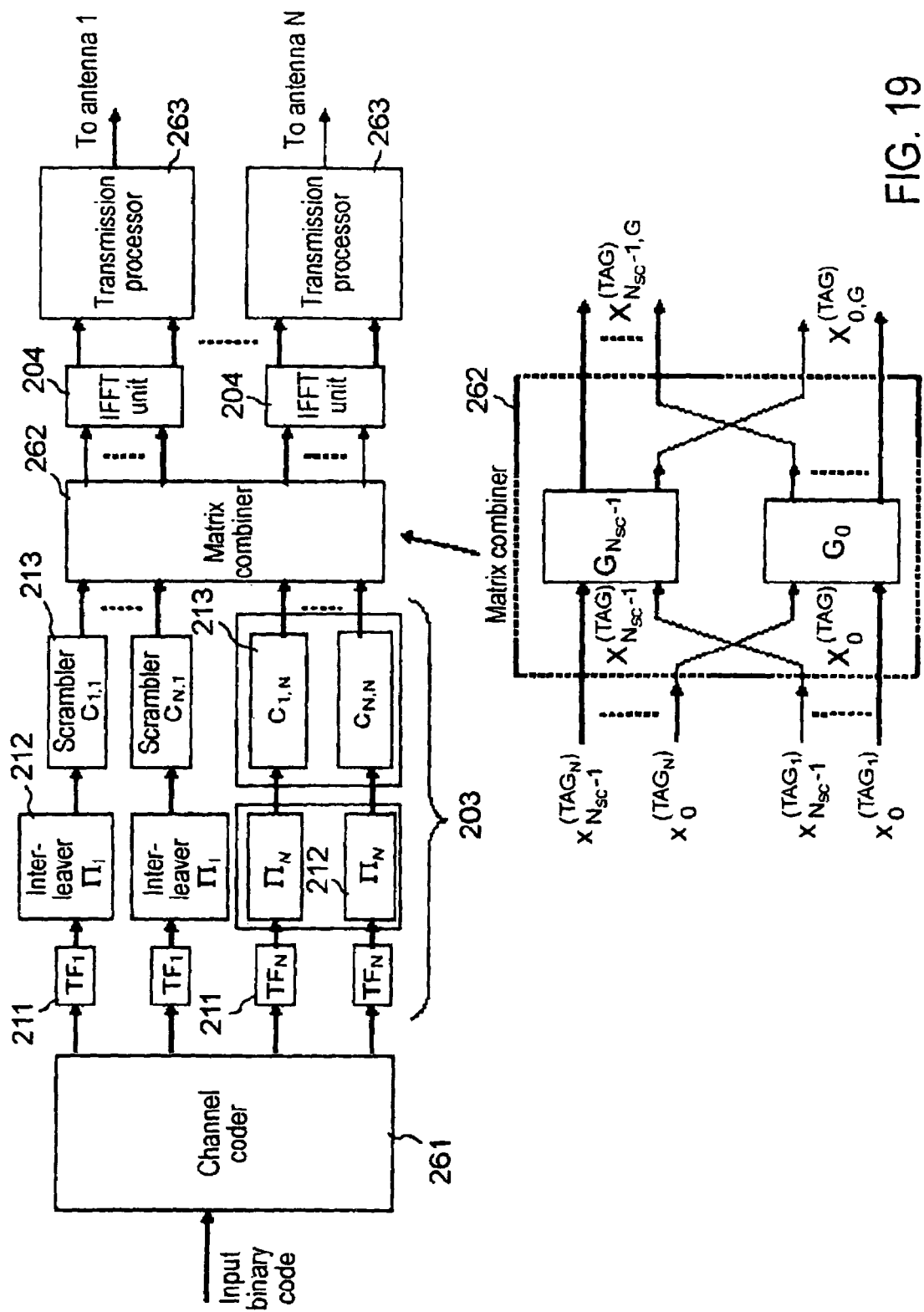
FIG. 19 is a block diagram showing a transmitter according to another example, which performs tagging and includes N pieces of transmitting antennas.

FIG. 19 shows another example of a transmitter in the communications system. The illustrated transmitter is a base station transmitter with N pieces of transmitting antennas. On the other hand, a receiver has M pieces of receiving antennas, where N≧M. Although this transmitter is similar to that shown in FIG. 5, it differs from the transmitter shown in FIG. 5 in that channel coder 261 for performing channel coding of the input binary signal and processing corresponding to the serial-to-parallel conversion by S/P convertors 201, 202 is provided instead of the above SIP convertors 201, 202 and that matrix combiner 262 is disposed between tagging unit 203 and N pieces of IFFT units 204. Transmission processors 263 for performing addition of cyclic prefixes, up-sampling, filtering by a band pass filter, and the like are arranged at the outputs of respective IFFT units 204.

At the transmitter, the signal to be transmitted is channel-coded at channel coder 261 before being modulated. The channel coding will include any type of forward error correction techniques, coding by repetition or spreading, and, if necessary, an interleaver. In the case of modulation, the signal to be transmitted is a constant modulus signal, such as QPSK, X-QAM (quadrature amplitude modulation), X-QPSK, where "X" is an integer. When X is an integer greater than 4, the signal shall be considered as a higher order level modulated signal. Typical example of X is "16" for the case of 16-QAM. After the modulation, the signal is mapped to the N pieces of transmitting antennas and subcarriers, as described above. Note that it is possible to combine the mapping with modulation, or perform the modulation after mapping.

Next, each signal stream that has been assigned to an antenna is processed by filtering at tagging unit 203, followed by an interleaving process and/or an scrambling process. It is also possible to filter the signal and then scramble it using a scrambling code before interleaving. Before IFFT (inverse fast Fourier transform) operation, it is possible to combine the signals in one way or another by multiplying the input signals with a matrix by matrix combiner 262. In an example shown in FIG. 19, in matrix combiner 262, the signal from a given subcarrier of one antenna is combined with the signal from a given subcarrier of the other remaining antennas. In general, the combination will involve using a matrix $G_{c1}$ which is related to the channel characteristics. As an example, after tagging, the signal assigned to subcarrier $c_1$ of antenna 1 (where $c_1 \in 0, \ldots, N_{SC}-1$, and $N_{SC}$ corresponds to the number of subcarriers) will be combined the signal assigned to the subcarrier $c_j$ of antenna j (where $c_j \in 0, \ldots, N_{SC}-1$ and $c_1 = c_j$), where j takes the value of 2, 3, ..., N-1, N. Mathematically, this kind of combination will be represented by $$X_{c,G}^{(TAG)} = G_c X_c^{(TAG)} \quad (11),$$

where $G_c$ is the combining matrix, $X_c^{(TAG)} = [x_c^{(TAG_1)} \ldots x_c^{(TAG_N)}]$ is the signal vector assigned to the subcarrier after tagging. The superscript "$TAG_i$" indicates that antenna number "i" is tagged with $TAG_i$. FIG. 19 illustrates the position of these signals. Here, when matrix $G_c$ is an identity matrix, the system is equivalent to a situation where there is no mixing matrix, that is, $$X_{c,G}^{(TAG)} = X_c^{(TAG)} \quad (12).$$

Next, tag assignment at the transmitter will be described.

For explanation purpose, it is assume that allpass filters whose transfer functions are given by the following equations, respectively, are used:

$$TF_1^{(u)} = \frac{0.5 + z^{-1}}{1 + 0.5 z^{-1}}, \quad (13)$$

$$TF_2^{(u)} = \frac{-0.5 + z^{-1}}{1 - 0.5 z^{-1}}. \quad (14)$$

The transfer functions of the inverse filters of those allpass filters are approximated by expanding $1/TF_1^{(u)}$ and $1/TF_2^{(u)}$, respectively.

Next, the receiver will be described. As the receiver, a receiver which is similar to one shown in FIG. 9 can be used. In this case, the signal received by each of the N pieces of receiving antennas is amplified and down-converted (i.e., subjected to the frequency conversion to a lower frequency) before removing the cyclic prefix and applying an $N_{IFFT}$-point FFT (fast Fourier transform). The signals transmitted from the transmitting antenna of antenna number i, i.e., transmitting antenna #i, will be retrieved as follows:

a) Descramble the signal using the scrambling code that has been used at transmitting antenna #i;

b) Deinterleave the signal using a deinterleaver corresponding the interleaver that has been used at transmitting antenna #i; and c) Filter the signal using an inverse filter of the filter associated with transmitting antenna #i.

Next, the operations of the system of this exemplary embodiment will be described.

For explanation purposes, it is assumed that after serial-to-parallel mapping to the antennas and subcarriers, the signal is a QPSK. As described above, the tag for each of the two transmitting antennas consist of a filter, an interleaver and a scrambling code. After filtering, a constant modulus property of the QPSK signal will be destroyed. Next, the filtered data is interleaved and then scrambled using the scrambling code. Depending on the tag chosen, the scrambling codes may or may not be the same.

At the receiver, FFT operation is performed onto the received signal after removing the cyclic prefix. Next, the signal is descrambled and filtered using an inverse filter.

Finally, a signal processing algorithm is applied to separate constant modulus signals from the non-constant modulus signals. As described above, the separated signals are free from permutation which has been problematic in the related art. The typical algorithm that can be applied for a QPSK signal is the constant modulus algorithm.

Figure 20:
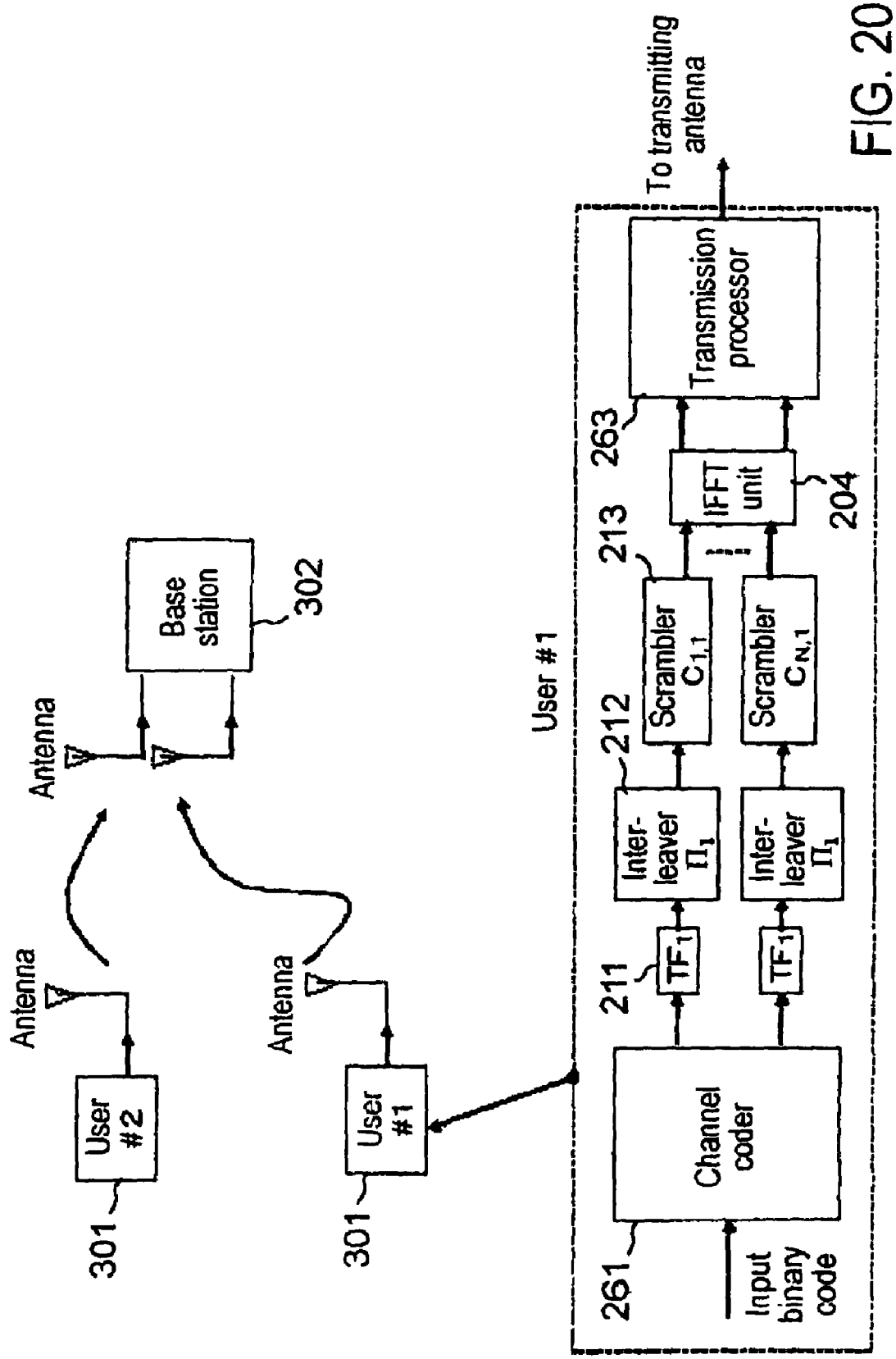
FIG. 20 is a view showing a system including a base station with multiple receiving antennas, and multiple transmitters each with a single transmitting antenna.

Next, a further exemplary embodiment will be described. In the above exemplary embodiment, a plurality of transmitting antennas are disposed for a single transmitter. In this exemplary embodiment, described is a case where a plurality of transmitters each having a single transmitting antenna are provided. This exemplary embodiment is configured in mind with the case of a mobile communications system in which a plurality of transmitting terminals each having a single transmitting antenna move over in a service area. Each transmitter uses the same frequency band to send data. The receiver, which is typically a base station, is equipped with a plurality of receiving antennas. FIG. 20 illustrates such a communications system. For explanation purpose, two transmitters 301 which perform transmission using the same frequency band are illustrated here. These two transmitters correspond to user #1 and user #2, respectively.

At each transmitter, the binary data is channel-coded, interleaved and modulated. It is assumed that a QPSK signal is obtained after modulation. Next, the modulated data is mapped to the subcarriers allocated. Since each transmitter 301 uses a single transmitting antenna, it is not necessary to perform serial-to-parallel conversion for antenna mapping. Furthermore, each transmitter 301 is assigned a different tag which comprises a filter, and an interleaver and/or a scrambler. The definition of the unique tag, i.e., difference in the tags, has already been explained. An example is shown in FIG. 20 for the case of user #1. After subcarrier mapping, signals are filtered, and interleaved and/or scrambled as explained earlier.

At receiver 302, i.e., the base station, FFT operation is performed onto the received signal after removing the cyclic prefix. Next, the signal is descrambled, and filtered using an inverse filter. Finally, a signal processing algorithm is applied to separate constant modulus signals from the non-constant modulus signals so as to retrieve desired signals without any permutation. The typical algorithm that can be applied for a QPSK signal is the constant modulus algorithm.

The principle of operation of the model shown in FIG. 20 is basically the same as that in FIG. 19. Thus, as explained in the model of FIG. 19, it is possible to separate all the signals from each of the users in the model shown in FIG. 20. In order to achieve this, each user must be assigned a unique tag which comprises a filter, and an interleaver and/or scrambler.

Figure 21:
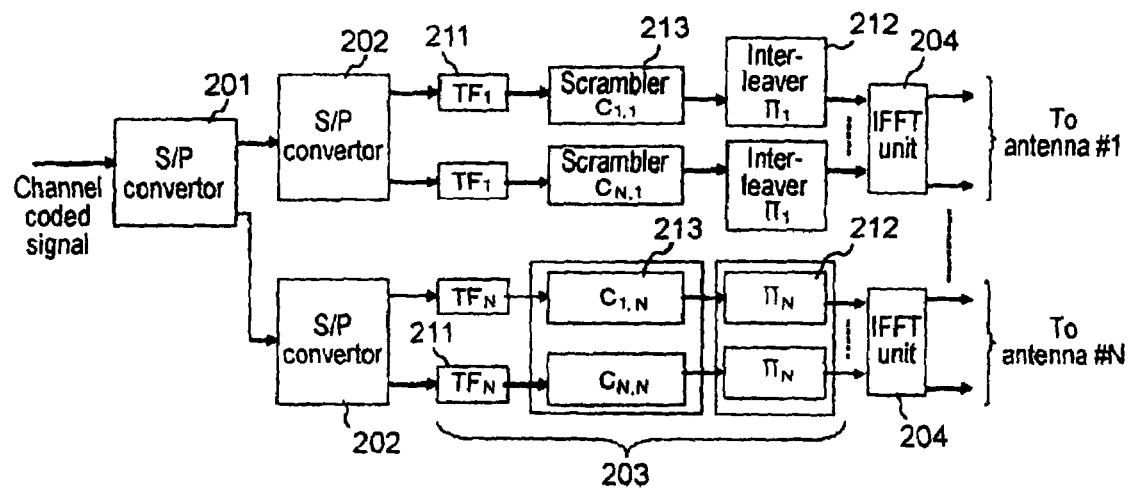
FIG. 21 is a block diagram showing another example of the transmitter.
Figure 22:
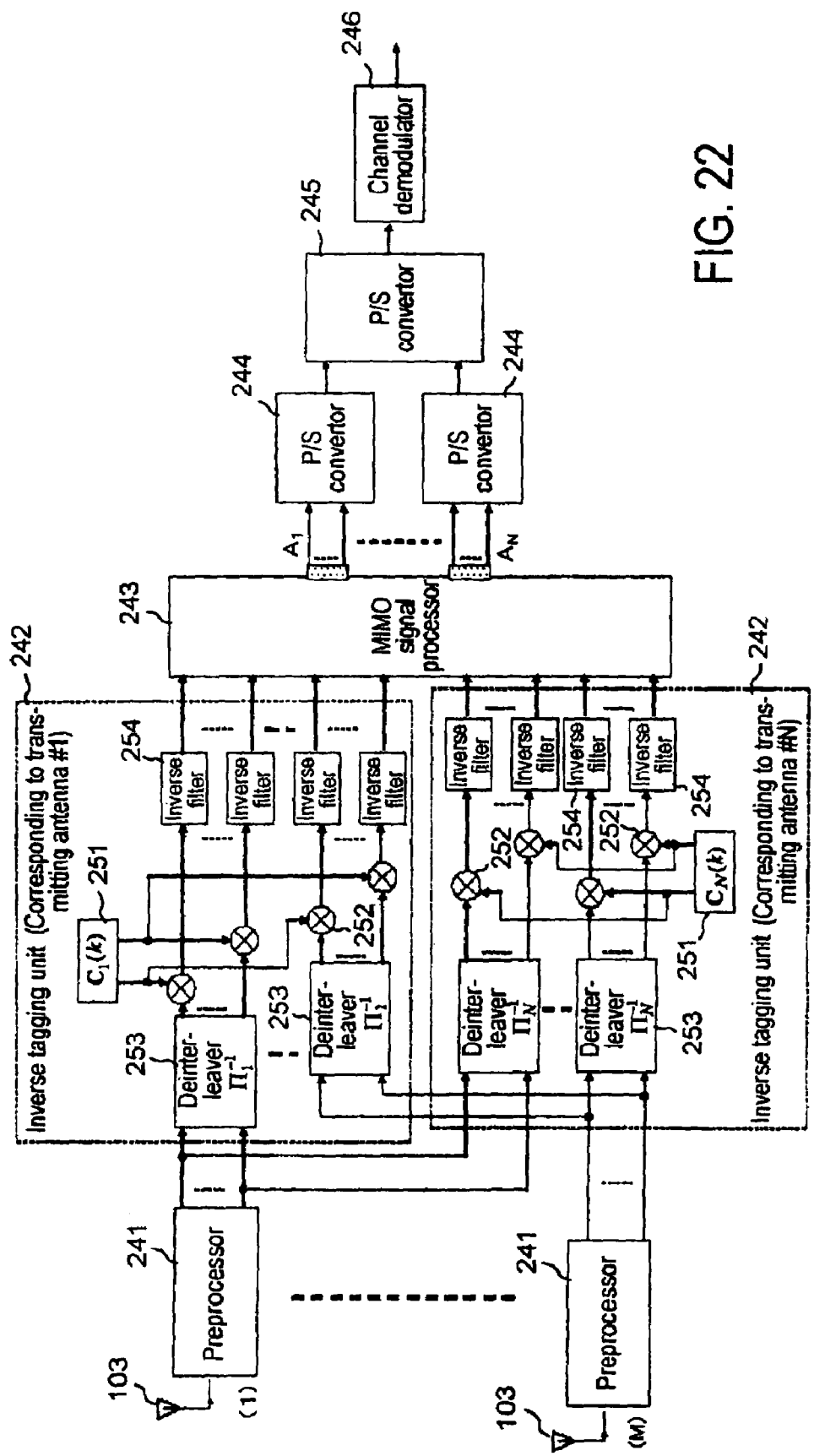
FIG. 22 is a block diagram showing another example of the receiver.

Next, a further exemplary embodiments will be explained. As described above, it is possible to reverse the positions of interleavers 212 and scramblers 213 in tagging unit 203 in the transmitter shown in FIG. 5. FIG. 21 illustrates such a transmitter. FIG. 22 shows a receiver which is used in combination with the transmitter shown in FIG. 21. The receiver shown in FIG. 22 is one in which the positions of multipliers 252, which are descramblers, and deinterleavers 253 are reversed in inverse tagging unit 242 in the receiver shown in FIG. 9. A communications system is constructed by the transmitter shown in FIG. 21, the receiver shown in FIG. 22, and a MIMO channel between the transmitter and the receiver. This communications system is a system which includes: a transmitter for transmitting signals over a transmission channel; and a receiver for receiving the signals, wherein the transmitter includes: a filter for filtering a modulated signal to modify amplitude and phase characteristics of the modulated signal; a scrambler for scrambling an output of the filtered signal; and an interleaver for interleaving the scrambled signal, and wherein the receiver includes: a deinterleaver for deinterleaving the received signal; a descrambler for descrambling the signal after deinterleaved: and an inverse filter for filtering the descrambled signal. Here, the scrambler and inverleaver are examples of items which function as processing means for performing interleaving process and/or scrambling process for the filtered signal. Further, the deinterleaver and the descrambler are examples of items which function as processing means for performing deinterleaving process and/or descrambling process for the received signal.

Figure 23:
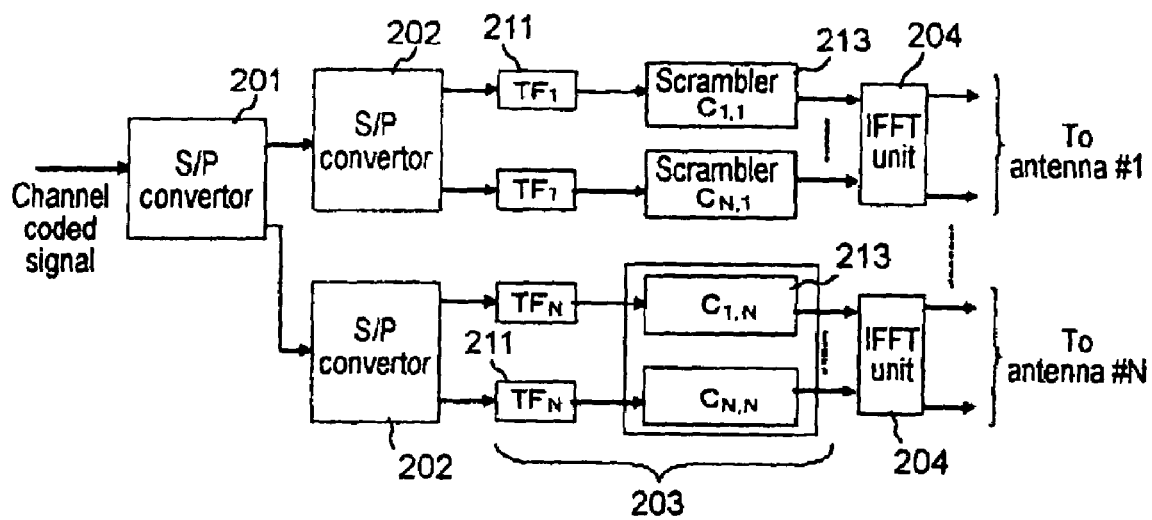
FIG. 23 is a block diagram showing a further example of the transmitter.
Figure 24:
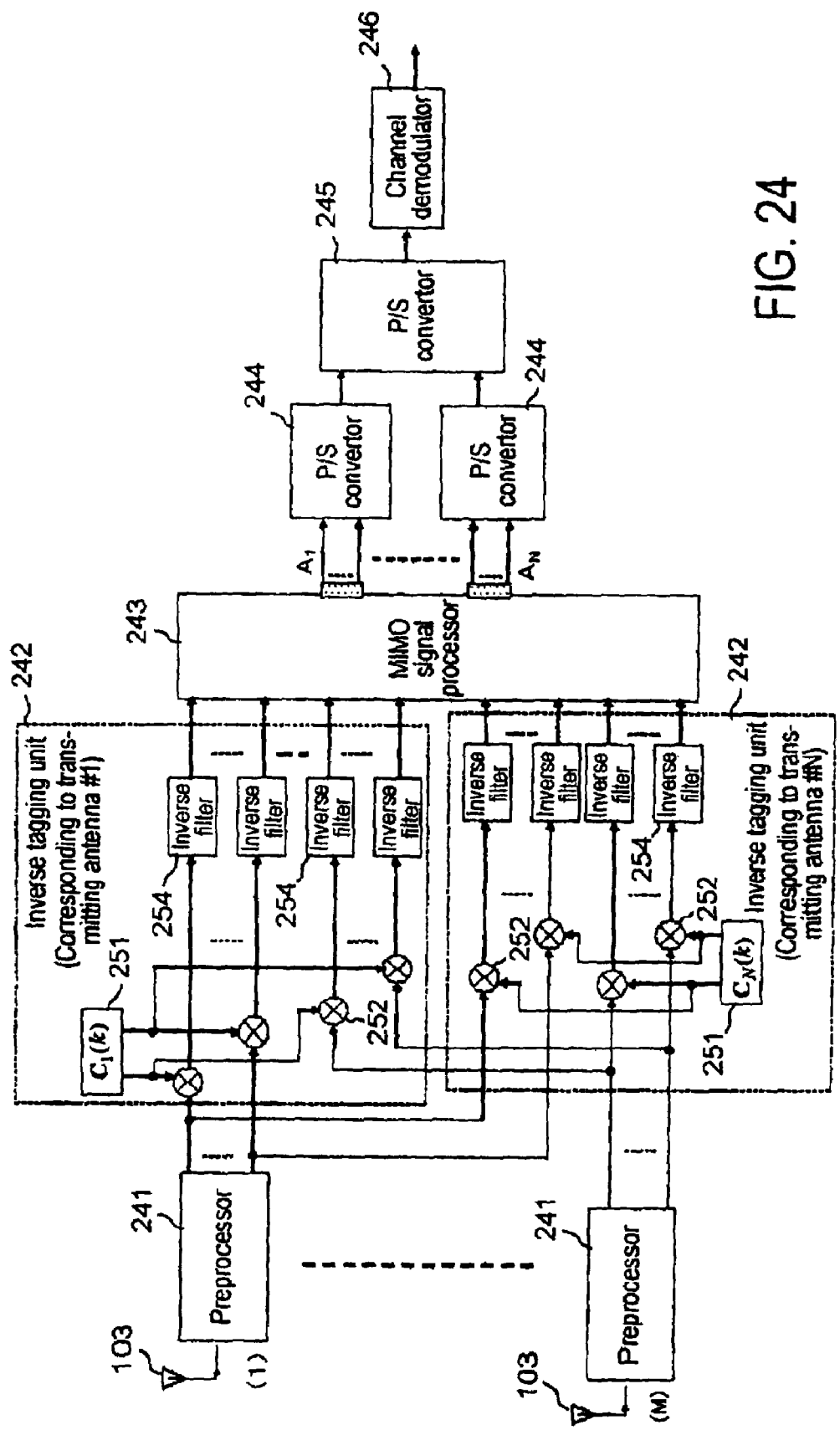
FIG. 24 is a block diagram showing a further example of the receiver.

Further, it is possible to remove interleavers 212 from tagging unit 203 in the transmitter shown in FIG. 5 FIG. 23 illustrates such a transmitter. FIG. 24 shows a receiver which is used in combination with the transmitter shown in FIG. 23. The receiver shown in FIG. 24 is one in which deinterleavers 253 are removed from inverse tagging unit 242 in the receiver shown in FIG. 9. A communications system is constructed by the transmitter shown in FIG. 23, the receiver shown in FIG. 24, and a MIMO channel between the transmitter and the receiver. This communications system is a system which includes: a transmitter for transmitting signals over a transmission channel; and a receiver for receiving the signals, wherein the transmitter includes: a filter for filtering a modulated signal to modify amplitude and phase characteristics of the modulated signal; and a scrambler for scrambling an output of the filtered signal, and wherein the receiver includes: a descrambler for descrambling the received signal; and an inverse filter for filtering the descrambled signal. Here, the scrambler is an example of items which function as processing means for performing interleaving process and/or scrambling process for the filtered signal. Further, the descrambler is an example of items which function as processing means for performing deinterleaving process and/or descrambling process for the received signal.

Figure 25:
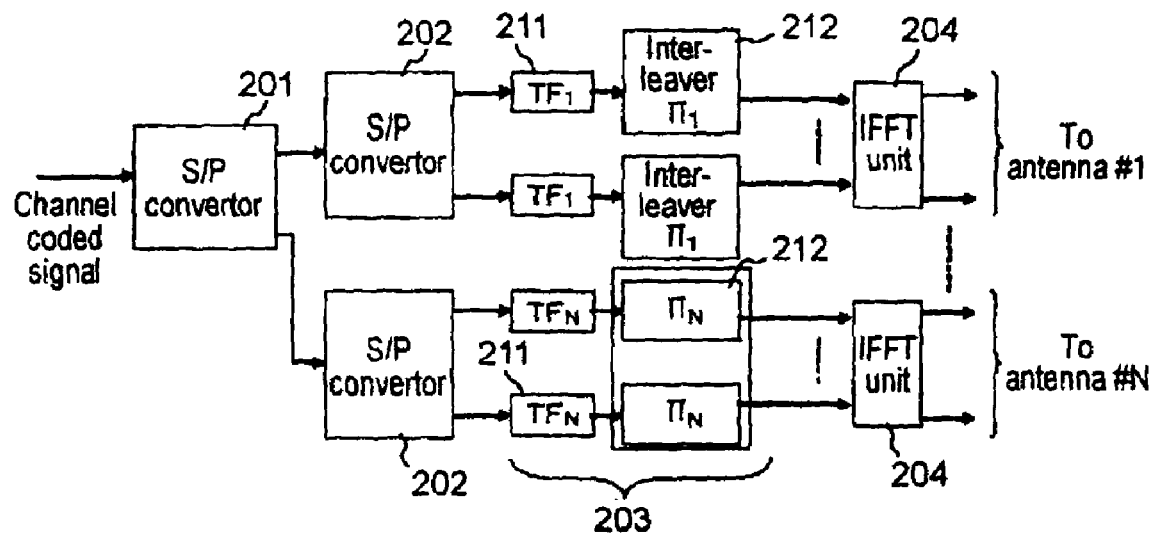
FIG. 25 is a block diagram showing a still further example of the transmitter.
Figure 26:
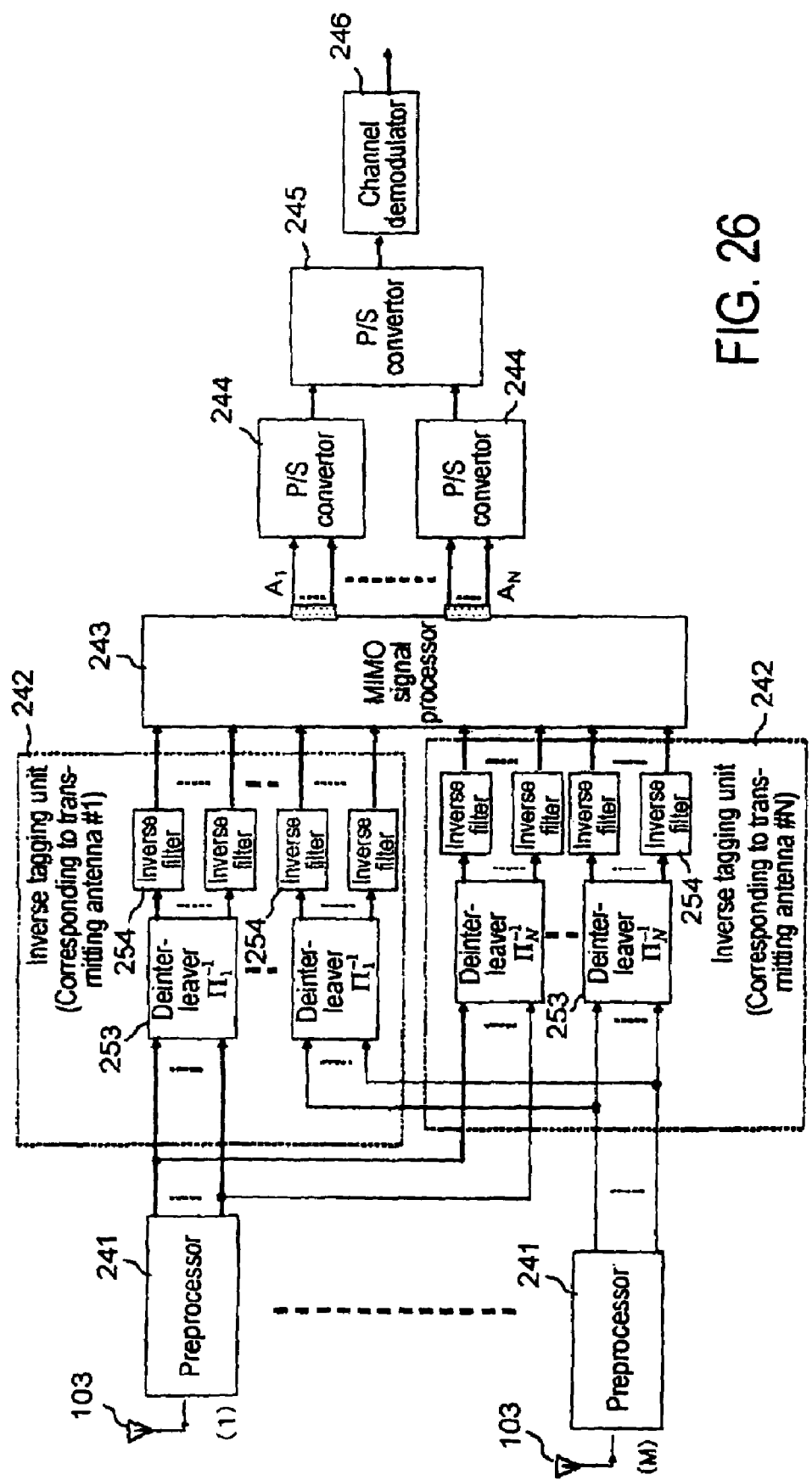
FIG. 26 is a block diagram showing a still further example of the receiver.

Furthermore, it is possible to remove scramblers 213 from tagging unit 203 in the transmitter shown in FIG. 5. FIG. 25 illustrates such a transmitter. FIG. 26 shows a receiver which is used in combination with the transmitter shown in FIG. 25. The receiver shown in FIG. 26 is one in which the descramblers made up by multipliers 252 and scrambling code generator 251 are removed from inverse tagging unit 242 in the receiver shown in FIG. 9. A communications system is constructed by the transmitter shown in FIG. 25, the receiver shown in FIG. 26, and a MIMO channel between the transmitter and the receiver. This communications system is a system which includes: a transmitter for transmitting signals over a transmission channel; and a receiver for receiving the signals, wherein the transmitter includes: a filter for filtering a modulated signal to modify amplitude and phase characteristics of the modulated signal; and an interleaver for interleaving the filtered signal, and wherein the receiver includes: a deinterleaver for deinterleaving the received signal; and an inverse filter for filtering the deinterleaved signal. Here, the interleaver is an example of items which function as processing means for performing interleaving process and/or scrambling process for the filtered signal. Further, the deinterleaver is an example of items which function as processing means for performing deinterleaving process and/or descrambling process for the received signal.

In each of the above exemplary embodiments, the filters may be assigned to multiple users or sources such that, for example, each user or each source has the same frequency characteristics. Alternatively, the filters may be assigned to multiple users or sources such that frequency spectra of the signals after filtering of the sources are overlapped. The filters in the transmitter are, for example, non-linear-filters or linear filters. An allpass filter, for example, can be used as the linear filter.

It is possible to reduce the latency of a system which employs filters as part of the tag by applying each of the above exemplary embodiments. The adoption of communications system described above reduces the complexity of a transceiver, and as a result, it is possible to reduce of overall cost of the transceiver.

The present invention explained above can be applied to a system with multiple transmitting antennas and a channel which is not frequency selective [B16]. Such a system can be implemented by multiple antennas and the OFDM scheme. As in other blind signal separation techniques, the present invention proposes a method which can perform signal separation without transmitting a training signal.

The present invention can also be applied in systems where a number of transmitters are sharing the same bandwidth, and a receiver employs multiple receiving antennas to separate the signals.

According to the present invention, since a combination of a filter, and an interleaver and/or a scrambling code is used as, for example, a unique filter which is assigned to each transmitting antenna or each transmitting source, it is possible to prevent the order of the tag filters from increasing and also prevent the delay due to usage of allpass filters from increasing.

It is possible to apply the technology based on the present invention to the field of mobile wireless communication where a number of users share the same channel, which might be a frequency channel, a time channel or a spreading code channel (CDMA). This is especially so in the wireless network where interference from other networks can be minimized or eliminated without using any training signal.

Another area which can find use of this invention is in the recording over a magnetic or optical recording medium with multiple sensors or heads. In such an application, it is possible to blindly retrieve data of all the parallel tracks without any permutation.

It is also possible to apply the present invention to single input single output (SISO) systems. Such a system could be a simple QPSK based transmitter and a receiver with a blind adaptive equalizer. In this kind of application, the real and imaginary part channels can be considered as a channel which results in a two-port transmitter and a two-port receiver. Applying the idea presented in this invention will always result in the real signal components being retrieved on the real part channel while the imaginary signal components will always be received on the imaginary part channel.

The invention claimed is:

1. A communications system comprising:
a transmitter for transmitting signals of at least two channel coded data streams over a common transmission channel; and
a receiver for receiving transmitted signals,
wherein said transmitter comprises:
   means for dividing each data stream into at least two sub-streams (or subcarriers) of a data stream;
   means for individually preprocessing each said sub-stream; and
   means for post-processing said individually preprocessed sub-streams with at least a subband filter,
wherein said means for individually preprocessing comprises:
   means for a filtering operation using filter coefficients that result in a filter with same frequency and phase response characteristics as a corresponding sub-stream of a second data stream sharing said common transmission channel; and
   a first processor for interleaving and/or scrambling each said sub-stream using an interleaver and/or scrambler that is different from a corresponding sub-stream of a second data stream sharing said common transmission channel, and
wherein said receiver comprises:
   a second processor for separately deinterleaving and/or descrambling of each of corresponding sub-streams received by multiple receivers, said interleaving and/or descrambling of sub-streams corresponding to the interleaving processing and/or the scrambling process performed at said preprocessing of target signal of a target signal of the transmitter; and
   a plurality of inverse filters for filtering each sub-stream, said plurality of inverse filters each having inverse frequency and phase response characteristics of a filter disposed at a corresponding substream of the transmitter.

2. The communications system according to claim 1, wherein the first processor includes:
a plurality of different interleavers which interleave outputs of the filtered signals as the different interleaving process; and
a plurality of different scramblers which scramble the interleaved signals as the different scrambling process,
wherein the second processor includes:
   a plurality of descramblers which correspond to the plurality of different scramblers and descramble the received signals; and
   a plurality of deinterleavers which correspond to the plurality of different interleavers and deinterleave the descrambled signals, and
wherein the plurality of inverse filters filter the deinterleaved signals.

3. The communications system according to claim 1, wherein the first processor includes:
a plurality of different scramblers which scramble outputs of the filtered signals as the different scrambling process; and
a plurality of different interleavers which interleave the scrambled signals as the different interleaving process,
wherein the second processor includes:
   a plurality of deinterleavers which correspond to the plurality of different interleavers and deinterleave the received signals; and
   a plurality of descramblers which correspond to the plurality of different scramblers and descramble the signals after being deinterleaved, and
wherein the plurality of inverse filters filter the descrambled signals.

4. The communications system according to claim 1,
wherein the first processor includes a plurality of different scramblers which scramble outputs of the filtered signals as the different scrambling process,
wherein the second processor includes a plurality of descramblers which correspond to the plurality of different scramblers and descramble the received signals, and
wherein the plurality of inverse filters filter the descrambled signals.

5. The communications system according to claim 1,
wherein the first processor includes a plurality of different interleavers which interleave the filtered signals as the different interleaving process,
wherein the second processor includes a plurality of deinterleavers which correspond to the plurality of different interleavers and deinterleave the received signals, and
wherein the plurality of inverse filters filter the deinterleaved signals.

6. The communications system according to claim 1, wherein the plurality of filters are assigned to a plurality of users or sources, and frequency spectrums of all the filters assigned to the respective users or sources overlap to each other.

7. The communications system according to claim 1, wherein the plurality of filters within the transmitter comprise non-linear filters.

8. The communications system according to claim 1, wherein the plurality of filters within the transmitter comprise linear filters.

9. The communications system according to claim 8, wherein the linear filter comprises an allpass filter.

10. A transmitter for transmitting signals of at least two channel coded data streams over a common transmission channel, said transmitter comprising:
means for dividing each data stream into at least two sub-streams (or subcarriers) of a data stream;
means for individually preprocessing each of said sub-streams; and
means for post-processing said individually preprocessed sub-streams with at least a subband filter,
wherein said means for individually preprocessing comprises:
   means for a filtering operation using filter coefficients that result in a filter with same frequency and phase response characteristics as a corresponding sub-stream of a second data stream sharing said common transmission channel; and
   a processor for interleaving and/or scrambling each said sub-stream using an interleaver and/or scrambler that is different from a corresponding sub-stream of a second data stream sharing said common transmission channel.

11. The transmitter according to claim 10, wherein the processor includes:
a plurality of different interleavers which interleave outputs of the filtered signals as the different interleaving process; and a plurality of different scramblers which scramble the interleaved signals as the different scrambling process.

12. The transmitter according to claim 10, wherein the processor includes:
a plurality of different scramblers which scramble outputs of the filtered signals as the different scrambling process; and
a plurality of different interleavers which interleave the scrambled signals as the different interleaving process.

13. The transmitter according to claim 10, wherein the processor includes a plurality of different scramblers which scramble outputs of the filtered signals as the different scrambling process.

14. The transmitter according to claim 10, wherein the processor includes a plurality of different interleavers which interleave the filtered signals as the different interleaving process.

15. The transmitter according to claim 10, wherein the plurality of filters are assigned to a plurality of users or sources, and frequency spectrums of all the filters assigned to the respective users or sources overlap to each other.

16. The transmitter according to claim 10, wherein the plurality of filters comprise non-linear filters.

17. The transmitter according to claim 10, wherein the plurality of filters comprise linear filters.

18. The transmitter according to claim 17, wherein the linear filter comprises an allpass filter.

* * * * *